United States Patent

Saga

(10) Patent No.: US 10,025,368 B2
(45) Date of Patent: Jul. 17, 2018

(54) COMPUTATION APPARATUS AND FREQUENCY DETERMINATION METHOD

(71) Applicant: FUJITSU LIMITED, Kawasaki-shi, Kanagawa (JP)

(72) Inventor: Kazushige Saga, Taito (JP)

(73) Assignee: FUJITSU LIMITED, Kawasaki (JP)

(*) Notice: Subject to any disclaimer, the term of this patent is extended or adjusted under 35 U.S.C. 154(b) by 34 days.

(21) Appl. No.: 15/204,266

(22) Filed: Jul. 7, 2016

(65) Prior Publication Data

US 2017/0038818 A1 Feb. 9, 2017

(30) Foreign Application Priority Data

Aug. 5, 2015 (JP) .................................. 2015-155254

(51) Int. Cl.
*G06F 1/32* (2006.01)
*G06N 3/08* (2006.01)

(52) U.S. Cl.
CPC ............. *G06F 1/3234* (2013.01); *G06N 3/08* (2013.01)

(58) Field of Classification Search
CPC .................................................... G06F 1/3234
See application file for complete search history.

(56) References Cited

U.S. PATENT DOCUMENTS

2006/0035149 A1 2/2006 Nanba et al.
2007/0255929 A1 11/2007 Kasahara et al.
(Continued)

FOREIGN PATENT DOCUMENTS

JP 2004-182512 7/2004
JP 2007-305148 11/2007
(Continued)

OTHER PUBLICATIONS

Scott Pakin et. al, "Energy Modeling of Supercomputers and Large-Scale Scientific Applications", IEEE, Jun. 2013, 6 pp.
(Continued)

*Primary Examiner* — Kim Huynh
*Assistant Examiner* — Eric Chang
(74) *Attorney, Agent, or Firm* — Staas & Halsey LLP

(57) ABSTRACT

An apparatus stores, based on results of sample-programs executed at operating frequencies, program-property information that includes innermost-loop-property information and other-loops-property information, and a minimum operating frequency indicating an operating frequency, of the operating frequencies, at which energy consumption upon execution of each of the sample-programs is the minimum; obtains first program-property information that is the program-property information corresponding to a first program before execution of the first program that is a program other than the sample-programs; and specifies second program-property information, of the program-property information stored in a memory, that includes information most similar to information included in the first program-property information obtained and estimating a first operating frequency at which the energy consumption upon execution of the first program is the minimum to be an operating frequency, of the minimum operating frequencies stored in the memory, that corresponds to the second program-property information specified.

11 Claims, 27 Drawing Sheets

(56) References Cited

U.S. PATENT DOCUMENTS

| | | | |
|---|---|---|---|
| 2008/0034236 A1 | 2/2008 | Takayama et al. | |
| 2009/0222429 A1* | 9/2009 | Aizenbud-Reshef | G06F 8/36 |
| 2013/0073883 A1 | 3/2013 | Vick et al. | |
| 2016/0054994 A1* | 2/2016 | Sakamoto | G06F 8/751 |
| | | | 717/120 |

FOREIGN PATENT DOCUMENTS

| | | |
|---|---|---|
| JP | 2008-40734 | 2/2008 |
| JP | 2013-242604 | 12/2013 |
| JP | 2014-527248 | 10/2014 |

OTHER PUBLICATIONS

Axel Auweter et al., "A Case Study of Energy Aware Scheduling on SuperMUC", ISC 2014, LNCS 8488, pp. 394-409, 2014.

\* cited by examiner

FIG. 19

| NUMBER | ADDRESS | INSTRUCTION CLASS | OPERAND | LOOP DEPTH |
|---|---|---|---|---|
| 1 | 4004e8 | 021 | — | 0 |
| 2 | 4004e9 | 020 | — | 0 |
| 3 | 4004ec | 021 | — | 0 |
| 4 | 4004f6 | 020 | — | 0 |
| 5 | 4004fb | 020 | — | 0 |
| 6 | 400505 | 020 | — | 0 |
| 7 | 40050a | 020 | — | 0 |
| 8 | 400510 | 020 | — | 0 |
| 9 | 40051e | 030 | — | 0 |
| 10 | 400521 | 021 | — | 0 |
| 11 | 400525 | 000 | 40050a | 0 |
| 12 | 40053d | 020 | — | 0 |
| 13 | 400540 | 000 | 4004fb | 0 |
| 14 | 400549 | 021 | — | 0 |
| 15 | 40054c | 000 | 4004f6 | 0 |
| 16 | 400552 | 020 | — | 0 |

FIG. 20

| NUMBER | ADDRESS | INSTRUCTION CLASS | OPERAND | LOOP DEPTH |
|---|---|---|---|---|
| 1 | 4004e8 | 021 | — | 0 |
| 2 | 4004e9 | 020 | — | 0 |
| 3 | 4004ec | 021 | — | 0 |
| 4 | 4004f6 | 020 | — | 0 |
| 5 | 4004fb | 020 | — | 0 |
| 6 | 400505 | 020 | — | 0 |
| 7 | 40050a | 020 | — | 1 |
| 8 | 400510 | 020 | — | 1 |
| 9 | 40051e | 030 | — | 1 |
| 10 | 400521 | 021 | — | 1 |
| 11 | 400525 | 000 | 40050a | 1 |
| 12 | 40053d | 020 | — | 0 |
| 13 | 400540 | 000 | 4004fb | 0 |
| 14 | 400549 | 021 | — | 0 |
| 15 | 40054c | 000 | 4004f6 | 0 |
| 16 | 400552 | 020 | — | 0 |

FIG. 21

| NUMBER | ADDRESS | INSTRUCTION CLASS | OPERAND | LOOP DEPTH |
|---|---|---|---|---|
| 1 | 4004e8 | 021 | — | 0 |
| 2 | 4004e9 | 020 | — | 0 |
| 3 | 4004ec | 021 | — | 0 |
| 4 | 4004f6 | 020 | — | 0 |
| 5 | 4004fb | 020 | — | 1 |
| 6 | 400505 | 020 | — | 1 |
| 7 | 40050a | 020 | — | 2 |
| 8 | 400510 | 020 | — | 2 |
| 9 | 40051e | 030 | — | 2 |
| 10 | 400521 | 021 | — | 2 |
| 11 | 400525 | 000 | 40050a | 2 |
| 12 | 40053d | 020 | — | 1 |
| 13 | 400540 | 000 | 4004fb | 1 |
| 14 | 400549 | 021 | — | 0 |
| 15 | 40054c | 000 | 4004f6 | 0 |
| 16 | 400552 | 020 | — | 0 |

FIG. 22

| NUMBER | ADDRESS | INSTRUCTION CLASS | OPERAND | LOOP DEPTH |
|---|---|---|---|---|
| 1 | 4004e8 | 021 | — | 0 |
| 2 | 4004e9 | 020 | — | 0 |
| 3 | 4004ec | 021 | — | 0 |
| 4 | 4004f6 | 020 | — | 1 |
| 5 | 4004fb | 020 | — | 2 |
| 6 | 400505 | 020 | — | 2 |
| 7 | 40050a | 020 | — | 3 |
| 8 | 400510 | 020 | — | 3 |
| 9 | 40051e | 030 | — | 3 |
| 10 | 400521 | 021 | — | 3 |
| 11 | 400525 | 000 | 40050a | 3 |
| 12 | 40053d | 020 | — | 2 |
| 13 | 400540 | 000 | 4004fb | 2 |
| 14 | 400549 | 021 | — | 1 |
| 15 | 40054c | 000 | 4004f6 | 1 |
| 16 | 400552 | 020 | — | 0 |

FIG. 23

| NUMBER | INSTRUCTION CLASS | NUMBER OF APPEARANCES (NUMBER OF TIMES) |
|---|---|---|
| 1 | 000 | 1 |
| 2 | 020 | 2 |
| 3 | 021 | 1 |
| 4 | 030 | 1 |

FIG. 24

| NUMBER | INSTRUCTION CLASS | NUMBER OF APPEARANCES (NUMBER OF TIMES) |
|---|---|---|
| 1 | 000 | 2 |
| 2 | 020 | 4 |
| 3 | 021 | 1 |

FIG. 25

| NUMBER | OPERATING FREQUENCY (GHz) |
|---|---|
| 1 | 1.4 |

FIG. 26

| NUMBER | INSTRUCTION CLASS | INNERMOST LOOP PROPERTY INFORMATION | OTHER LOOP PROPERTY INFORMATION | OPERATING FREQUENCY (GHz) |
|---|---|---|---|---|
| 1 | 000 | 1 | 2 | 1.4 |
|   | 020 | 2 | 4 |  |
|   | 021 | 1 | 1 |  |
|   | 030 | 1 | 0 |  |
|   | 031 | 0 | 0 |  |
| 2 | 000 | 1 | 4 | 1.8 |
|   | 020 | 2 | 0 |  |
|   | 021 | 0 | 1 |  |
|   | 030 | 1 | 3 |  |
|   | 031 | 3 | 2 |  |
| 3 | 000 | 1 | 1 | 1.6 |
|   | 020 | 2 | 2 |  |
|   | 021 | 0 | 1 |  |
|   | 030 | 0 | 0 |  |
|   | 031 | 0 | 1 |  |

FIG. 27

| NUMBER | ADDRESS | INSTRUCTION CLASS | OPERAND | LOOP DEPTH |
|---|---|---|---|---|
| 1 | 4006d2 | 021 | — | 0 |
| 2 | 4006d5 | 020 | — | 1 |
| 3 | 4006e2 | 031 | — | 1 |
| 4 | 4006e6 | 020 | — | 2 |
| 5 | 4006ec | 020 | — | 2 |
| 6 | 4006ef | 000 | 4006e6 | 2 |
| 7 | 4005f3 | 021 | — | 1 |
| 8 | 4005f9 | 020 | — | 1 |
| 9 | 4005fc | 000 | 4006d5 | 1 |
| 10 | 400601 | 021 | — | 0 |

FIG. 28

| NUMBER | INSTRUCTION CLASS | NUMBER OF APPEARANCES (NUMBER OF TIMES) |
|---|---|---|
| 1 | 000 | 1 |
| 2 | 020 | 2 |

FIG. 29

| NUMBER | INSTRUCTION CLASS | NUMBER OF APPEARANCES (NUMBER OF TIMES) |
|---|---|---|
| 1 | 000 | 1 |
| 2 | 020 | 2 |
| 3 | 021 | 1 |
| 4 | 031 | 1 |

FIG. 30

| NUMBER | INSTRUCTION CLASS | INNERMOST LOOP PROPERTY INFORMATION | OTHER LOOP PROPERTY INFORMATION |
|---|---|---|---|
| 1 | 000 | 1 | 1 |
| | 020 | 2 | 2 |
| | 021 | 0 | 1 |
| | 030 | 0 | 0 |
| | 031 | 0 | 1 |

FIG. 31

| NUMBER | INSTRUCTION CLASS | NUMBER OF APPEARANCES (NUMBER OF TIMES) |
|---|---|---|
| 1 | 000 | 6 |
| 2 | 020 | 14 |
| 3 | 021 | 2 |

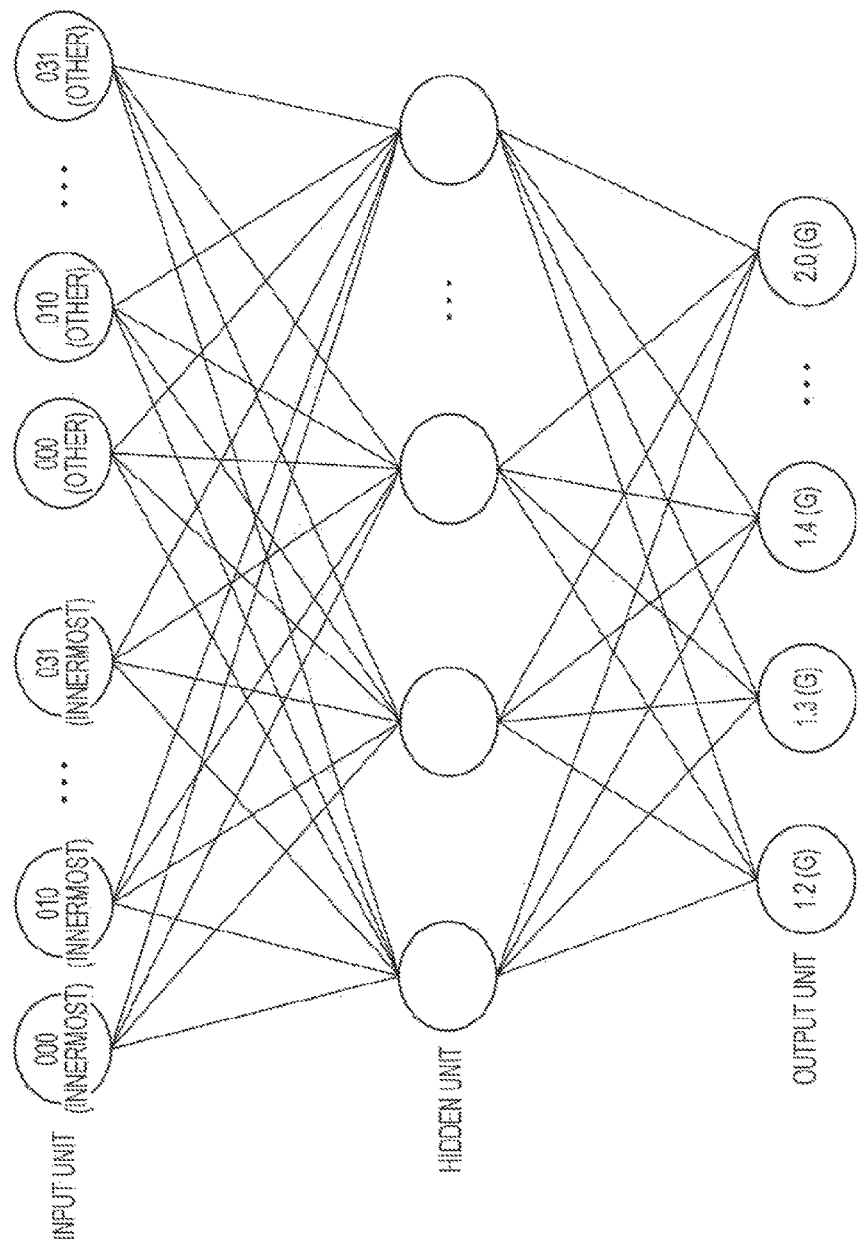

COMPUTATION APPARATUS AND FREQUENCY DETERMINATION METHOD

CROSS-REFERENCE TO RELATED APPLICATION

This application is based upon and claims the benefit of priority of the prior Japanese Patent Application No. 2015-155254, filed on Aug. 5, 2015, the entire contents of which are incorporated herein by reference.

FIELD

The embodiments discussed herein are related to a computation apparatus and a frequency determination method.

BACKGROUND

In recent years, there has been developed a system in which the number of computation nodes exceeds 100 thousand nodes, for the purpose of high performance in a parallel computation apparatus system (hereinafter, referred to as a high performance computing (HPC) system) which is an information processing system.

In such a system, an enormous amount of power (for example, 50 (MW) or more for each time) is consumed upon processing in a case of performing exa floating-point number operations per second (EFLOPS) scale processing. Thus, a developer of the system (hereinafter, simply referred to as a developer) may have to perform system building, job performance control, and the like after considering power saving upon execution of various programs in the system.

Japanese National Publication of International Patent Application No. 2014-527248, Japanese Laid-open Patent Publication No. 2008-040734, Japanese Laid-open Patent Publication No. 2007-305148, Japanese Laid-open Patent Publication No. 2013-242604, and Japanese Laid-open Patent Publication No. 2004-182512 are examples of the related art.

As a technique for achieving power saving in such a system (hereinafter, referred to as a target system), there is known, for example, a technique that uses a dynamic voltage and frequency scaling (DVFS) function to reduce power consumption. The DVFS is a function that controls either an operating voltage or a clock frequency (hereinafter, referred to as an operating frequency) or both thereof of a central processing unit (CPU). Controlling the operating voltage or the operating frequency with use of this function allows changing the amount of power consumption (hereinafter, referred to as energy consumption) of the CPU. Thus, use of this function allows reducing the energy consumption (energy saving) of the target system (for example, an HPC system of a distributed memory type) (hereinafter, a system that manages energy saving in the target system will be referred to as an energy saving management system).

Specifically, energy saving in the target system is achieved by a technique as follows. A system builder or a system manager (hereinafter, collectively referred to as a manager), as a preparation step for operating the target system, executes a plurality of test programs (hereinafter, referred to as sample programs) along with changing the operating frequency of the CPU of the target system to obtain various types of information related to execution of each program. The manager inputs the obtained information into the energy saving management system. Then, the energy saving management system obtains from the obtained information a coefficient used in an estimation formula that estimates the energy consumption of programs other than the test programs and stores the coefficient in, for example, a database.

Meanwhile, in a case of executing a new program in the target system (hereinafter, referred to as first-time execution) upon operation of the target system, a user of the target system (hereinafter, simply referred to as a user) requests a job management program to execute the new program (job that includes the new program) by specifying that the execution corresponds to first-time execution and by adding user-defined identification information that allows unique identification of the new program. A job management system sets the frequency of the CPU to an operating frequency defined by the system for first-time execution (hereinafter, referred to as a default operating frequency) to perform the job including the new program. Accordingly, the energy saving management system may obtain information as to the new program that is of the same type as the information obtained upon execution of the test programs.

Then, the user, in a case of executing the new program for the second and subsequent times, requests the job management system to execute the new program by adding the identification information of the new program. In this case, the energy saving management system extracts from the database various types of information obtained upon first-time execution of the new program using the specified identification information as a key and performs estimation of the operating frequency at which the energy consumption accompanied by execution of the new program is the minimum (hereinafter, referred to as a minimum energy consumption frequency), in which the estimation is based on the coefficient of the estimation formula obtained upon execution of the test programs. The energy saving management system sets the estimated minimum energy consumption frequency in the CPU and executes the new program. Accordingly, the energy saving management system may reduce the energy consumption in a case of executing the new program for the second and subsequent times.

However, in the above method, first-time execution may have to be performed again not only in a case where a program is newly created but also each time a main part of a program is modified. Thus, according to the frequency of modification of the new program, energy saving may not be achieved with respect to the energy consumption accompanied by execution of the new program due to the energy consumption accompanied by the first-time execution.

Therefore, an object of one aspect of the embodiments is to provide a computation apparatus and a frequency determination method that estimate an operating frequency upon execution of a program.

SUMMARY

According to an aspect of the invention, an apparatus includes: a memory; and one or more processors coupled to the memory and configured to: store, based on a result of executing each of sample programs at a plurality of operating frequencies, program property information that includes innermost loop property information and other loops property information in association with a minimum operating frequency for each of the sample programs, the innermost loop property information including a number of instructions for each type included in an innermost loop of instructions included in loops in the sample program, the other loops property information including a number of instructions for each type included in the loops other than the innermost loop of the instructions included in the loops in the sample program, and the minimum operating frequency indicating an operating frequency, of the plurality of operating frequencies, at which energy consumption upon execution of each of the sample programs is the minimum; obtain first program property information that is the program property information corresponding to a first program before execution of the first program that is a program other than each of the sample programs; and specify second program property information, of the program property information stored in the memory, that includes information most similar to information included in the first program property information obtained and estimating a first operating frequency at which the energy consumption upon execution of the first program is the minimum to be an operating frequency, of the minimum operating frequencies stored in the memory, that corresponds to the second program property information specified.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram illustrating a specific example of instruction information;

FIG. 20 is a diagram illustrating a specific example of the instruction information;

FIG. 21 is a diagram illustrating a specific example of the instruction information;

FIG. 22 is a diagram illustrating a specific example of the instruction information;

FIG. 23 is a diagram illustrating a specific example of innermost loop property information;

FIG. 24 is a diagram illustrating a specific example of other loops property information;

FIG. 25 is a diagram illustrating a specific example of frequency information;

FIG. 26 is a diagram illustrating a specific example of correspondence information;

FIG. 27 is a diagram illustrating a specific example of first instruction information;

FIG. 28 is a diagram illustrating a specific example of first innermost loop property information;

FIG. 29 is a diagram illustrating a specific example of first other loops property information;

FIG. 30 is a diagram illustrating a specific example of first correspondence information;

FIG. 31 is a diagram illustrating a specific example of the other loops property information in a second embodiment; and FIG. 32 is a diagram illustrating a specific example of a neural network in a third embodiment.

DESCRIPTION OF EMBODIMENTS

Configuration of Information Processing System

Figure 1:
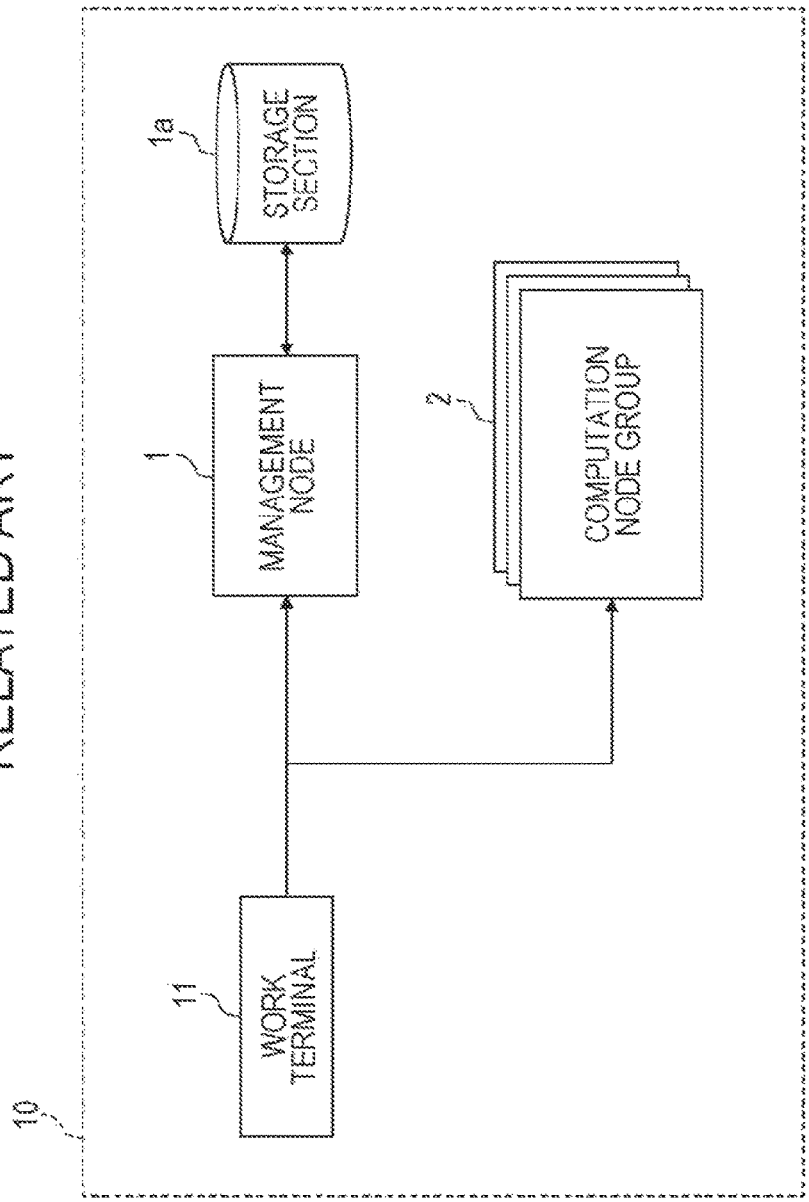
FIG. 1 is a diagram illustrating an entire configuration of an information processing system.

FIG. 1 is a diagram illustrating an entire configuration of an information processing system 10. The information processing system 10 (hereinafter, referred to as a target system 10) illustrated in FIG. 1 includes a management node 1 (hereinafter, referred to as a computation apparatus 1 or an information processing apparatus 1), a computation node group 2, and a work terminal 11. The information processing system 10 is, for example, an HPC system.

The computation node group 2 is configured of, for example, physical machines. Each computation node includes, for example, physical resources such as a CPU (one or more processors) and a memory.

The management node 1 performs a process of determining a minimum energy consumption frequency for execution of a new program (a program newly created or added or a modified program) before execution of the new program is started in the computation node group 2. The management node 1 includes a storage section (memory) 1a that stores information which may have to be used for performing a process of determining an operating frequency for each program. Hereinafter, the management node 1 will be described assuming that an energy saving management system and a job management system are built therein.

The work terminal 11 is a terminal that a user, a manager, a developer, or the like uses to instruct the management node 1 to perform processing. The work terminal 11, for example, may be installed at a place different from a data center (not illustrated) that the management node 1 or the computation node group 2 includes.

Specific Example of Energy Saving Using DVFS Function

Next, a specific example of energy saving using a DVFS function will be described. FIG. 2 to FIG. 6 are diagrams illustrating specific examples of energy saving using DVFS. The contents of FIG. 2 to FIG. 4 relate to, for example, the content of Pakin, S et. al, "Energy Modeling of Supercomputers and Large-Scale Scientific Applications". The contents of FIG. 5 and FIG. 6 relate to, for example, the content of Auweter, A et. al, "A Case Study of Energy Aware Scheduling on SuperMUC".

Figure 2:
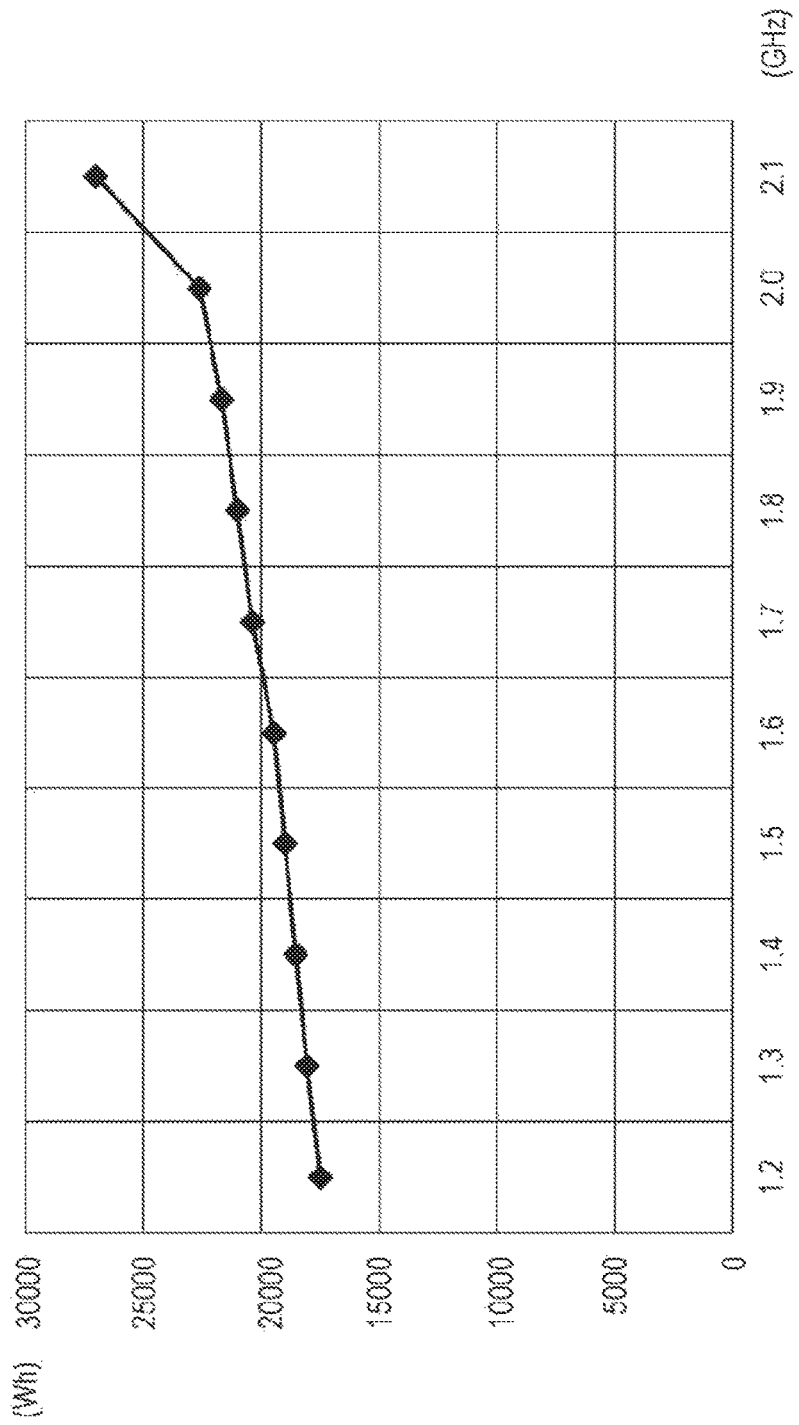
FIG. 2 is a diagram illustrating a specific example of energy saving using DVFS.
Figure 3:
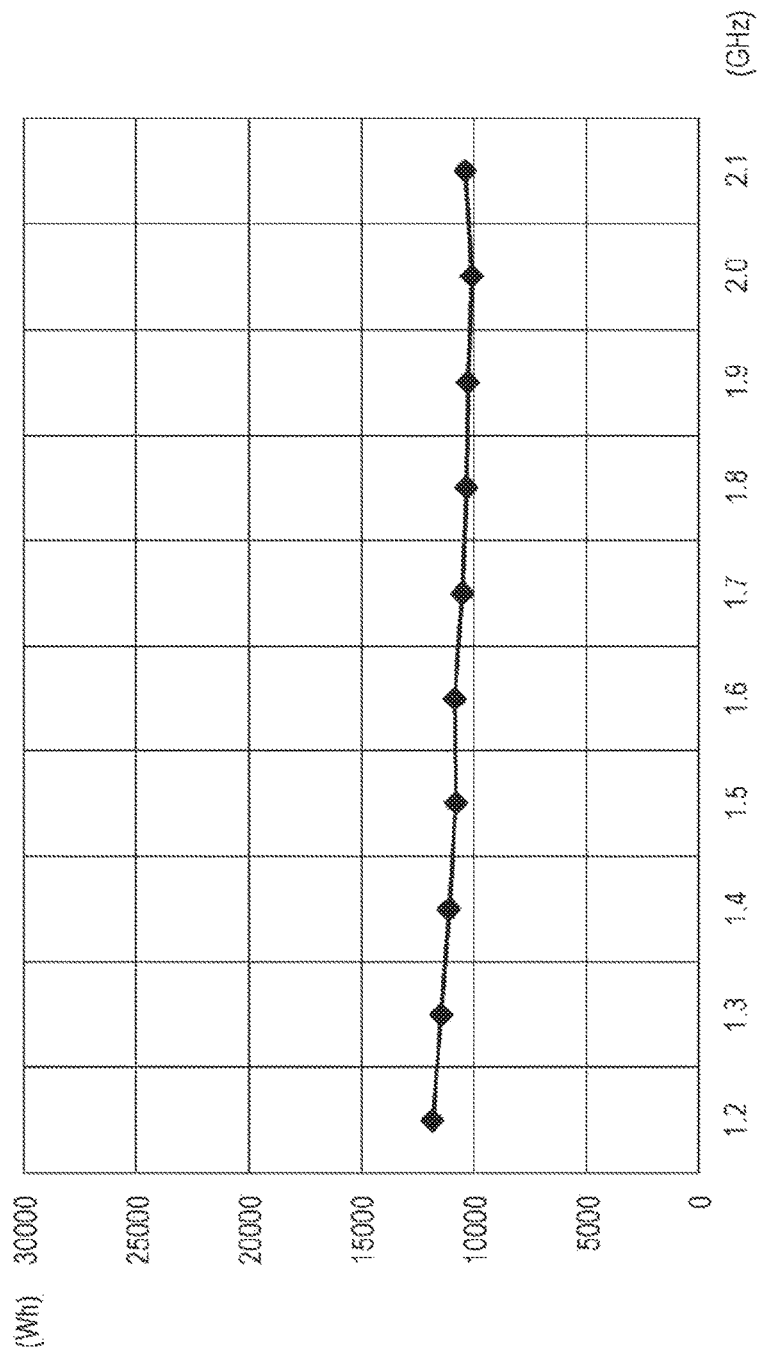
FIG. 3 is a diagram illustrating a specific example of energy saving using DVFS.
Figure 4:
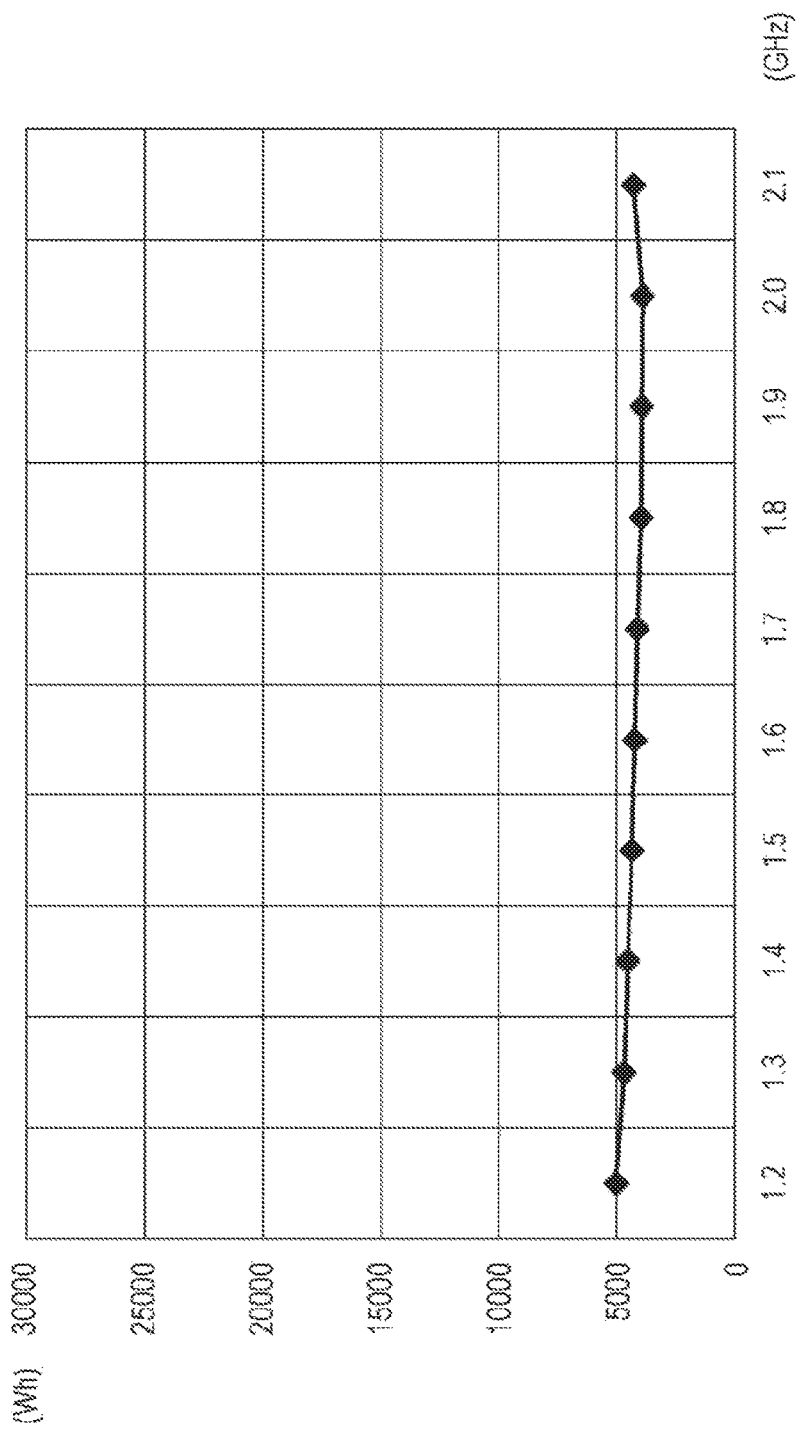
FIG. 4 is a diagram illustrating a specific example of energy saving using DVFS.

First, the relationship between operating frequencies for test programs and the energy consumption accompanied by execution of the test programs will be described. FIG. 2 to FIG. 4 are specific examples of the energy consumption at each operating frequency upon execution of the test programs. Specifically, FIG. 2 to FIG. 4 are diagrams respectively illustrating cases where each of test programs A, B, and C is executed at a plurality of operating frequencies. In the graphs illustrated in FIG. 2 to FIG. 4, the horizontal axis represents the operating frequency (GHz), and the vertical axis represents the energy consumption (Wh).

As illustrated in FIG. 2, the energy consumption accompanied by execution of the test program A is increased as the operating frequency is increased. Thus, in the example illustrated in FIG. 2, the energy consumption accompanied by execution of the test program A is the minimum when the operating frequency is "1.2 (GHz)". As illustrated in FIG. 3, the energy consumption accompanied by execution of the test program B is decreased as the operating frequency is increased. Thus, in the example illustrated in FIG. 3, the energy consumption accompanied by execution of the test program B is the minimum when the operating frequency is "2.1 (GHz)". As illustrated in FIG. 4, the energy consumption accompanied by execution of the test program C is the minimum when the operating frequency is "2.0 (GHz)".

That is, the amount of time for execution of a program is generally increased in a case of decreasing the operating frequency upon execution of the program. Thus, decreasing the operating frequency may not reduce the energy consumption accompanied by execution of the program (the product of the energy consumption per unit time and the amount of time for execution of the program). Therefore, simply decreasing the operating frequency at which a new program (hereinafter, referred to as a first program) is executed may not allow the developer to minimize the energy consumption accompanied by execution of the program. Otherwise, as illustrated in FIG. 3 and FIG. 4, an adverse effect may be caused in terms of the energy consumption.

Figure 5:
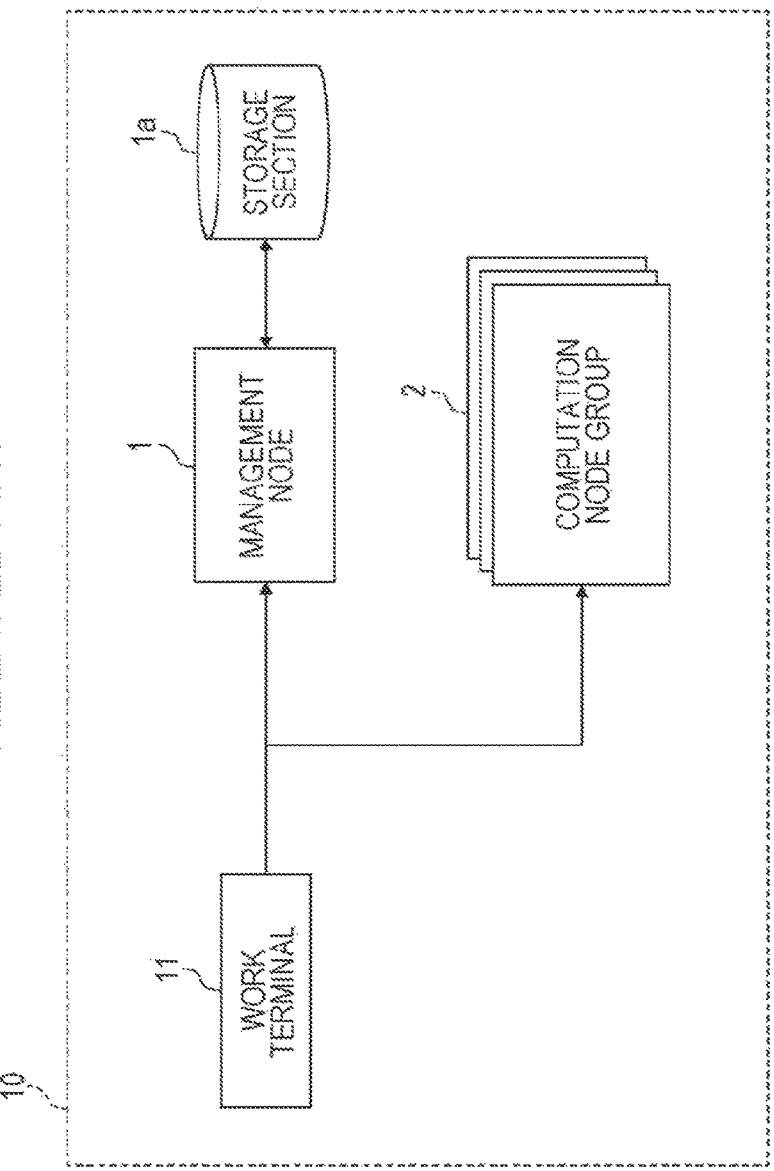
FIG. 5 is a diagram illustrating a specific example of energy saving using DVFS.
Figure 6:
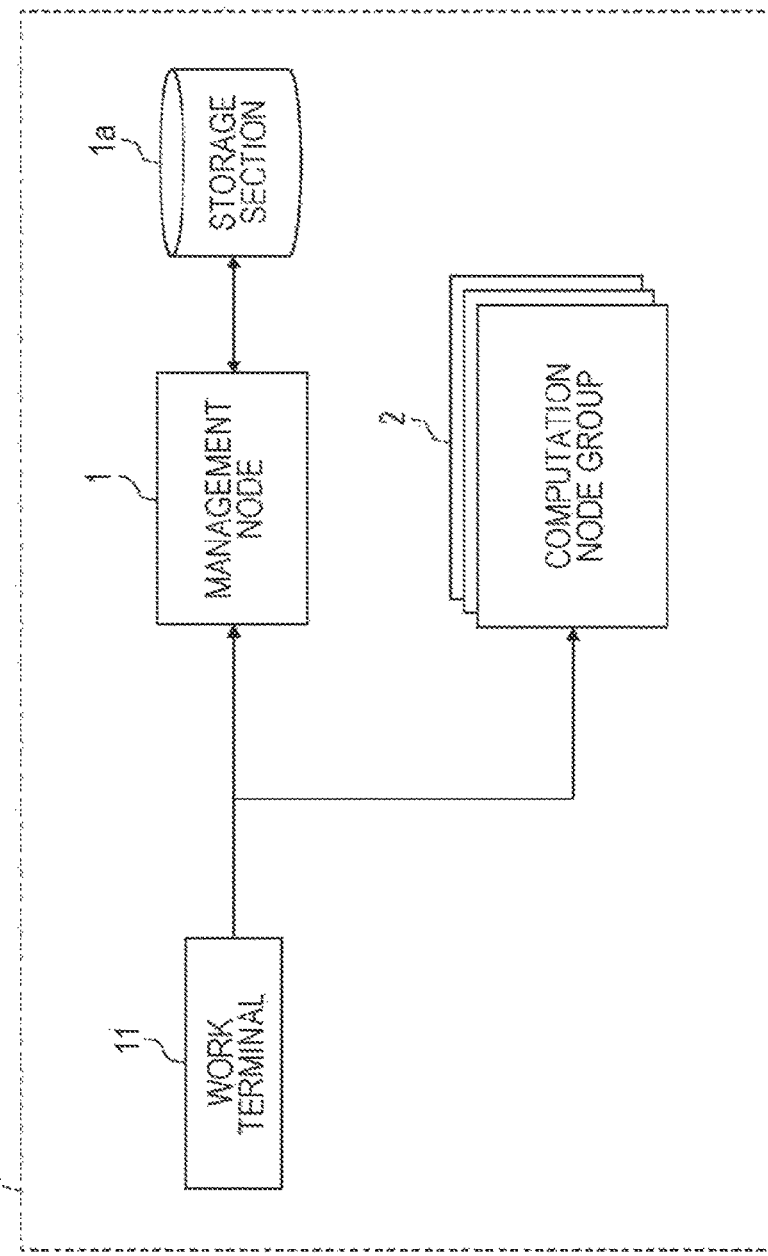
FIG. 6 is a diagram illustrating a specific example of energy saving using DVFS.

Therefore, the energy saving management system, as illustrated in FIG. 5 and FIG. 6 recognizes the tendency of the energy consumption with respect to the operating frequency in a case, for example, where the target system 10 executes the test programs and estimates the minimum energy consumption frequency for the first program.

Specifically, estimation of the minimum energy consumption frequency is divided into a preparation step upon, for example, building of the target system 10 and an operation upon operation of the target system 10. In the preparation step for the target system 10, the management node 1 causes the CPUs of the computation node group 2 to execute the plurality of test programs prepared in advance at a plurality of operating frequencies as illustrated in FIG. 5. The plurality of operating frequencies is, for example, a plurality of operating frequencies that the CPUs of the computation node group 2 support.

In this case, the management node 1 measures, for example, the number of instructions executed per unit time (giga instructions per second; GIPS), the memory bandwidth per unit time (giga bytes per second; GBS), the average number of cycles per instruction executed (cycles per instruction; CPI), the energy consumption per unit time, and the amount of time for execution upon execution of each test program. The management node 1 stores the measured information in association with each test program in the storage section 1a.

Then, the management node 1 performs determination of a coefficient of a formula (hereinafter, simply referred to as an estimation formula) that estimates the energy consumption in a case of executing the first program at each operating frequency in the target system, in which the determination is based on each information that stores execution results of the computation node group 2 of FIG. 5. This estimation formula may be determined by the manager upon, for example, building of the target system 10.

Meanwhile, upon operation of the target system 10, the user performs first-time execution of the first program in the computation node group 2 as illustrated in FIG. 6. The user request the job management system to execute the first program by specifying that the current execution of the first program corresponds to first-time execution and by adding information that allows unique specification of the first program including the update state thereof. In this case, the user performs first-time execution of the first program using an operating frequency that is defined in advance as a system default.

The energy saving management system measures, for example, the number of instructions executed per unit time (GIPS), the memory bandwidth per unit time (GBS), the average number of cycles per instruction executed (CPI), the energy consumption per unit time, and the amount of time for execution upon execution of the first program, along with the first-time execution of the first program. The energy saving management system records the measured information in the storage section 1a with information that allows identification of the first program as a search key. This measured information is used upon execution for the second and subsequent times to determine the minimum energy consumption frequency for execution of the first program. That is, in a case where the user requests the target system 10 to execute the first program for the second and subsequent times, the user requests the execution by adding identification information of the first program in order to use the previously measured information. Information such as the identification information of the first program may be managed by the user.

Next, the energy saving management system of the management node 1 performs estimation of the energy consumption in a case of executing the first program at each operating frequency, in which the estimation is based on information obtained by the computation node group 2 and the coefficient of the estimation formula determined by the management node 1. The energy saving management system of the management node 1 determines the operating frequency corresponding to the minimum energy consumption of the energy consumption estimated by the management node 1.

Accordingly, the energy saving management system may estimate the minimum energy consumption frequency for the first program without operating the first program at the plurality of operating frequencies. Thus, the target system 10 may reduce the energy consumption upon execution of the first program for the second and subsequent times.

However, in a case of the above method, the user may have to perform first-time execution not only in a case where a program is newly created but also each time a program is modified. In addition, types of programs that are executed for the first time may include a program that takes an enormous amount of time for execution. Thus, the energy consumption upon first-time execution may not be ignored according to the frequency of modification of a program, the amount of time for execution of a program, and the like. In addition, information related to whether or not first-time execution of each program is performed or the identification information used to specify the first program may be generated and managed by the user. Thus, the manager may have to consider an increase in the load on the user, the possibility of work mistakes made by the user, and the like.

Furthermore, in a case of performing first-time execution of a new program, the minimum energy consumption frequency for the new program may not be estimated. Thus, the user executes the new program at a default operating frequency of the target system 10. Therefore, in a case where the default operating frequency of the target system is different from the minimum energy consumption frequency for the new program, the energy consumption accompanied by execution of the new program for the second and subsequent times may not be minimized.

Therefore, in the present embodiment, the minimum energy consumption frequency for the first program may be estimated without performing first-time execution of the first program in the operation step of the target system 10. Thus, the information indicating whether or not first-time execution of the first program is performed, the identification information used to specify the first program, and the like may not have to be managed in the present embodiment.

Specifically, the energy saving management system of the management node 1 in the present embodiment performs static analysis of each test program as a preparation to detect a loop that is predominant in the energy consumption of the first program (for example, a loop that consumes a predetermined or more proportion of the energy consumption of the first program accompanied by execution of the first program) and creates correspondence information between information related to instructions included in the loop (hereinafter, referred to as program property information) and the minimum energy consumption frequency obtained by executing each test program at various frequencies.

Meanwhile, upon operation of the target system 10, the energy saving management system of the management node 1 in the present embodiment, in a case where the user instructs the management node 1 to execute the first program, performs static analysis of the first program to extract the program property information of the same type as that extracted from the test programs in the preparation. The energy saving management system estimates the minimum energy consumption frequency for the first program to be the operating frequency corresponding to the program property information, of the program property information included in the correspondence information extracted by using the test programs, that is most similar to the program property information of the first program (hereinafter, referred to as first program property information).

That is, the energy consumption of the entire target system accompanied by execution of a program is the total sum of the energy consumption of the computation node group that executes the program as parallel jobs. Thus, the energy consumption of the CPU accompanied by execution of the program by each computation node is determined by operation of the CPU upon execution of the program. Therefore, the management node 1 analyzes a description, of the descriptions of the test programs, related to operation of the CPU (a description in the test programs related to the instructions included in the predominant loop in the energy consumption) and creates the correspondence information between the program property information which is the result of analysis and the minimum energy consumption frequency for the test programs.

Meanwhile, upon operation of the target system 10, the management node 1, before executing the first program, analyzes a description, of the descriptions of the first program, related to operation of the CPU (a description in the first program related to the instructions included in the predominant loop in the energy consumption) to obtain the first program property information which is the result of analysis. The management node 1 specifies a test program, of the test programs, having program property information that is most similar to the content of the first program property information obtained. Then, the management node 1 estimates the minimum energy consumption frequency for the first program to be the minimum energy consumption frequency for the specified test program.

Accordingly, the management node 1 may determine the minimum energy consumption frequency for the first program without performing first-time execution. Thus, the user may execute the first program at the minimum energy consumption frequency without performing first-time execution.

In many cases, the loop that is predominant in the energy consumption corresponds to multiple loops in a program operating in the target system 10 (for example, an HPC system). In addition, a description related to computation in the nest loops is mostly described in the innermost loop. Thus, the loop that consumes the greatest energy of the loops included in the multiple loops corresponds to the innermost loop in many cases.

Determination of the address of an array to be computed, communication of a computation result with other computation nodes in a distributed parallel program, I/O processing, and the like are performed in the loops other than the innermost loop of the multiple loops predominant in the energy consumption (hereinafter, referred to as the other loops). Process waiting time occurs while these processes are performed. Thus, in general, the energy consumption accompanied by execution of the program is decreased.

That is, the innermost loop may be interpreted as a loop that consumes a large energy, and the other loops may be interpreted as creating intervals (rhythm) of energy consumption of the innermost loop and characterizing the trend of the energy consumption for each program.

Thus, in the description below, the loop that is predominant in the energy consumption will be described as being configured of the innermost loop and the other loops. In addition, the program property information will be described as including innermost loop property information which is the property information related to the innermost loop and other loops property information which is the property information related to the other loops. The innermost loop and the other loops may not be distinguished from each other as described above.

Hardware Configuration of Management Node

Figure 7:
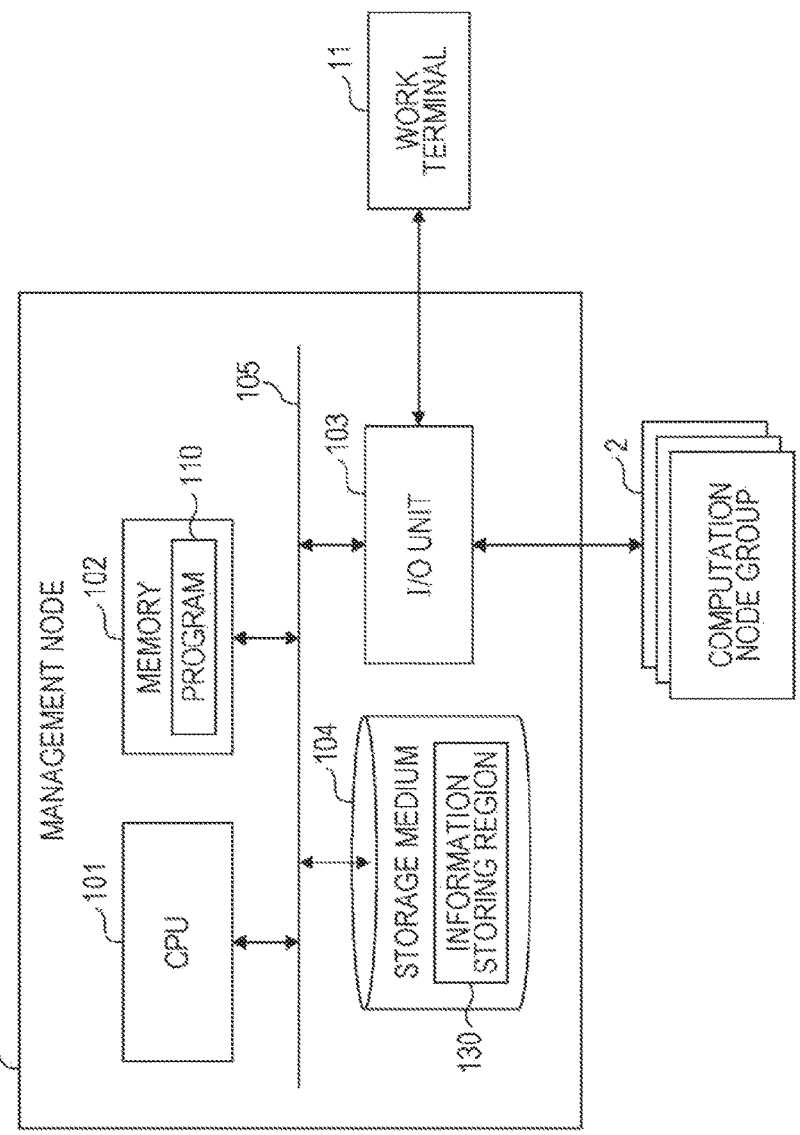
FIG. 7 is a diagram illustrating a hardware configuration of a management node.

Next, a hardware configuration of the management node 1 will be described. FIG. 7 is a diagram illustrating a hardware configuration of the management node 1.

The management node 1 includes a CPU 101 that includes one or more processors, a memory 102, an external interface (I/O unit) 103, and a storage medium (storage) 104. Each section is connected to each other through a bus 105.

The storage medium 104 stores a program 110 that is used to perform a process of determining the operating frequency upon execution of the first program (hereinafter, referred to as an operating frequency determination process), in a program storing region (not illustrated) in the storage medium 104.

The CPU 101, as illustrated in FIG. 7, loads the program 110 from the storage medium 104 into the memory 102 upon execution of the program 110 and performs the operating frequency determination process in cooperation with the program 110.

The storage medium 104 includes an information storing region 130 (hereinafter, referred to as an information storage section 130) that stores, for example, information used upon performing the operating frequency determination process. The external interface 103 communicates with the computation node group 2 and the work terminal 11. The storage section 1a described with FIG. 1 may correspond to the storage medium 104.

Software Configuration of Management Node

Figure 8:
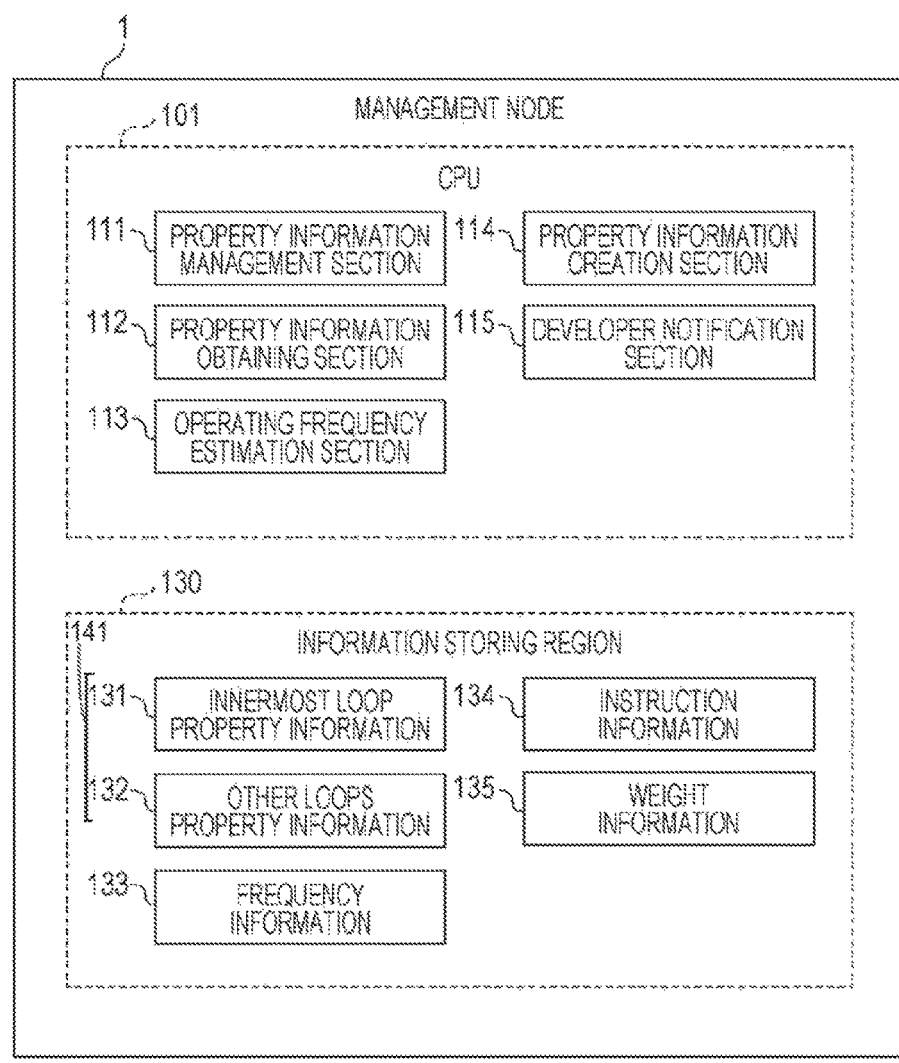
FIG. 8 is a functional block diagram of the management node of FIG. 7.

Next, a software configuration of the management node 1 will be described. FIG. 8 is a functional block diagram of the management node 1 of FIG. 7. The CPU 101, in cooperation with the program 110, operates as a property information management section 111, a property information obtaining section 112 (hereinafter, simply referred to as an information obtaining section 112), and an operating frequency estimation section 113. In addition, the CPU 101, in cooperation with the program 110, operates as a property information creation section 114 (hereinafter, referred to as an other loops property information creation section 114) and a developer notification section 115.

As illustrated in FIG. 8, the information storing region 130 stores innermost loop property information 131, other loops property information 132, frequency information 133 (hereinafter, referred to as a minimum operating frequency 133), instruction information 134, and weight information 135. Hereinafter, the innermost loop property information 131 and the other loops property information 132 that correspond to each other will be collectively referred to as program property information 141. The innermost loop property information 131, the other loops property information 132, and the frequency information 133 that correspond to each other will be collectively referred to as correspondence information 142.

The property information management section 111 references the result of executing the plurality of test programs respectively at the plurality of operating frequencies. The result of executing the plurality of test programs may be stored in, for example, the information storing region 130. The property information management section 111 obtains the innermost loop property information 131 that includes the number (number of appearances) of instructions for each type included in the innermost loop of the instructions included in each loop in the test programs. The property information management section 111 obtains the other loops property information 132 that includes the number (number of appearances) of the instructions for each type included in the loops other than the innermost loop of the instructions included in each loop in the test programs.

The property information management section 111 obtains the frequency information 133 that indicates the operating frequency, of the plurality of operating frequencies at which the test programs are operated, at which the energy consumption upon execution of the test programs is the minimum. The property information management section 111 creates the correspondence information 142 in which the innermost loop property information 131, the other loops property information 132, and the frequency information 133 are associated with each other for each of the plurality of test programs and stores the correspondence information 142 in the information storing region 130.

The property information management section 111 creates the instruction information 134 that is, for example, information related to CPU instructions included in the loops in the test programs and performs creation of the innermost loop property information 131 and the other loops property information 132 based on the created instruction information 134. Specific examples of the innermost loop property information 131, the other loops property information 132, the frequency information 133, and the instruction information 134 will be described later.

The property information obtaining section 112 obtains innermost loop property information (hereinafter, referred to as first innermost loop property information 131a) and other loops property information (hereinafter, referred to as first other loops property information 132a) corresponding to the first program before execution of the first program. Hereinafter, the first innermost loop property information 131a and the first other loops property information 132a will be collectively referred to as first program property information 141a.

The operating frequency estimation section 113 specifies program property information (hereinafter, referred to as second program property information 141b), of the program property information 141 stored in the information storing region 130, that includes information most similar to information included in the first program property information 141a. The operating frequency estimation section 113 estimates frequency information at which the energy consumption upon execution of the first program is the minimum (hereinafter, referred to as first frequency information 133a or a first operating frequency 133a) to be the frequency information corresponding to the second program property information 141b of the frequency information 133 stored in the information storing region 130.

The operating frequency estimation section 113 may stop estimating the first frequency information 133a in a case where there does not exist information of which the matching ratio to the information included in the first program property information 141a is greater than a predetermined threshold in the program property information 141 stored in the information storing region 130.

The property information creation section 114 multiplies the number of instructions for each type of instruction included in each loop, of the loops in the test programs, other than the innermost loop by the weight information 135 corresponding to the depth of each loop. The property information creation section 114 adds the values that are calculated from multiplication by the weight information 135 for each type of instruction to create the other loops property information 132.

The developer notification section 115 notifies the developer in a case where the second program property information 141b does not exist in the program property information 141 stored in the information storing region 130.

Summary of First Embodiment

Figure 9:
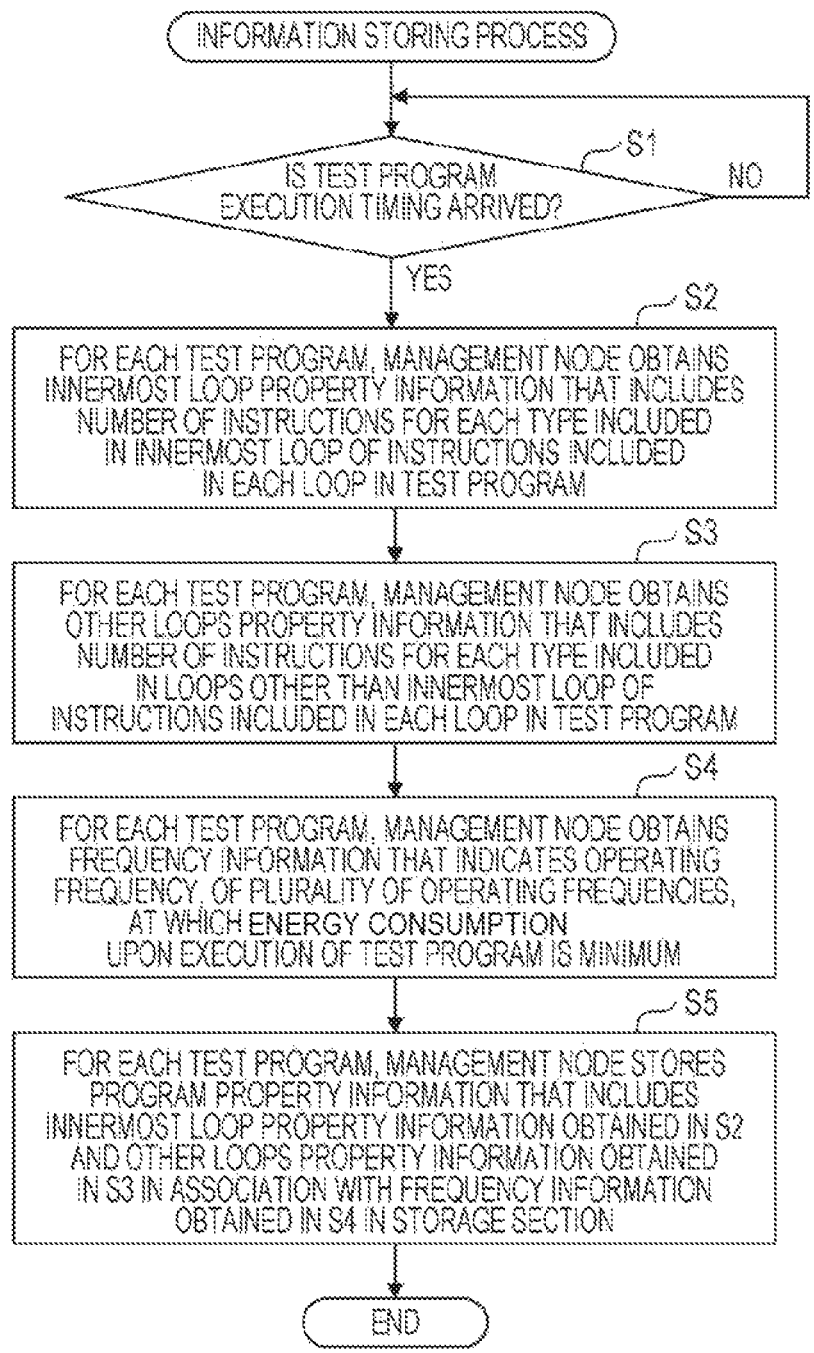
FIG. 9 is a flowchart illustrating a summary of an operating frequency determination process in a first embodiment.
Figure 10:
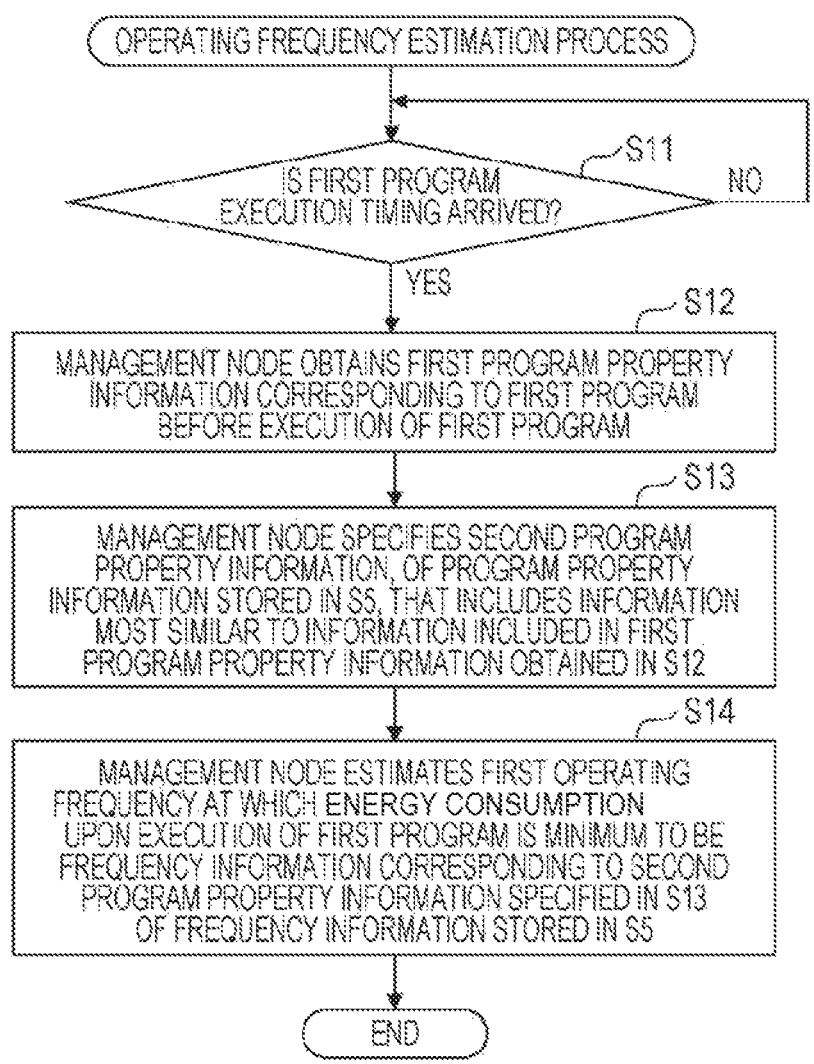
FIG. 10 is a flowchart illustrating a summary of the operating frequency determination process in the first embodiment.
Figure 11:
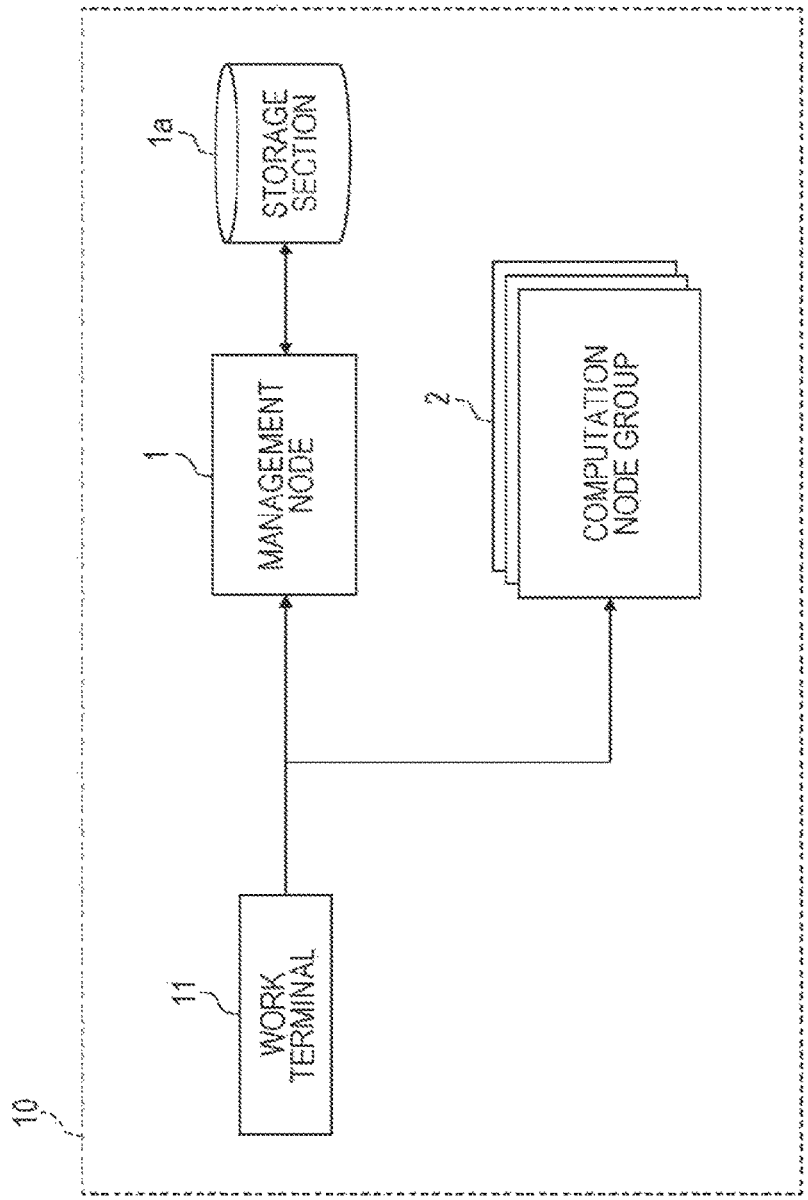
FIG. 11 is a diagram illustrating a summary of the operating frequency determination process in the first embodiment.

Next, a summary of a first embodiment will be described. FIG. 9 and FIG. 10 are flowcharts illustrating a summary of the operating frequency determination process in the first embodiment. FIG. 11 to FIG. 14 are diagrams illustrating a summary of the operating frequency determination process in the first embodiment. With reference to FIG. 11 to FIG.

14, the operating frequency determination process of FIG. 9 and FIG. 10 will be described.

Summary of Information Storing Process

First, in the operating frequency determination process, a process of storing the program property information 141 in the information storing region 130 (hereinafter, referred to as an information storing process) will be described.

The management node 1 waits until a test program execution timing as illustrated in FIG. 9 (NO in S1). The test program execution timing may be, for example, a timing at which a new system is built.

In a case where the test program execution timing arrives (YES in S1), the management node 1 executes the test programs at the plurality of operating frequencies in the target system 10. For each test program, the management node 1 obtains the innermost loop property information 131 that includes the number of instructions for each type included in the innermost loop of the instructions included in each loop in the test program (S2). In addition, in this case, for each test program, the management node 1 obtains the other loops property information 132 that includes the number of instructions for each type included in the loops other than the innermost loop of the instructions included in each loop in the test program (S3).

Furthermore, in this case, for each test program, the management node 1 obtains the frequency information 133 that indicates the operating frequency, of the plurality of operating frequencies at which the test program is executed, at which the energy consumption upon execution of the test program is the minimum (S4). The management node 1, as illustrated in FIG. 11, stores in the information storing region 130 the correspondence information 142 that is created by associating the innermost loop property information 131 and the other loops property information 132 (program property information 141) with the frequency information 133 for each test program (S5).

That is, the energy consumption of the entire system accompanied by execution of a program (for example, the test programs or the first program) is dependent on the energy consumption of the CPU accompanied by execution of the program. The energy consumption of the CPU accompanied by execution of the program is determined by operation of the CPU upon execution of the program. Thus, the management node 1 analyzes a description related to the instructions included in each loop in the test programs and creates the correspondence information 142 by associating the program property information 141 which is the result of analysis with the frequency information 133 which is the minimum energy consumption frequency for the test programs.

Accordingly, the management node 1, as described later, may compare the program property information 141a of the first program with the program property information 141 stored in the information storing region 130.

The loops in the first program become multiple loops in a case where the first program includes a multidimensional array. Calculations performed along with execution of the first program are concentrated in the innermost loop which is the deepest loop. Thus, in the process of S2, the management node 1 obtains the innermost loop property information 131 which is the information related to the innermost loop.

In the process of S3, the management node 1 obtains not only the innermost loop property information 131 but also the other loops property information 132 which is the information related to the other loops. In the process of S5, the management node 1 associates not only the innermost loop property information 131 but also the other loops property information 132 with the frequency information 133 to create the correspondence information 142.

Summary of Operating Frequency Estimation Process

Next, in the operating frequency determination process, a process of estimating the operating frequency at which the energy consumption upon execution of the first program is the minimum (hereinafter, referred to as an operating frequency estimation process) will be described.

The management node 1 waits until a first program execution timing as illustrated in FIG. 10 (NO in S11). The first program execution timing is, for example, a timing before execution of the first program in the computation node group 2.

In a case where the first program execution timing arrives (YES in S11), the management node 1, before execution of the first program, obtains the first program property information 141a which is the program property information corresponding to the first program (S12).

Figure 12:
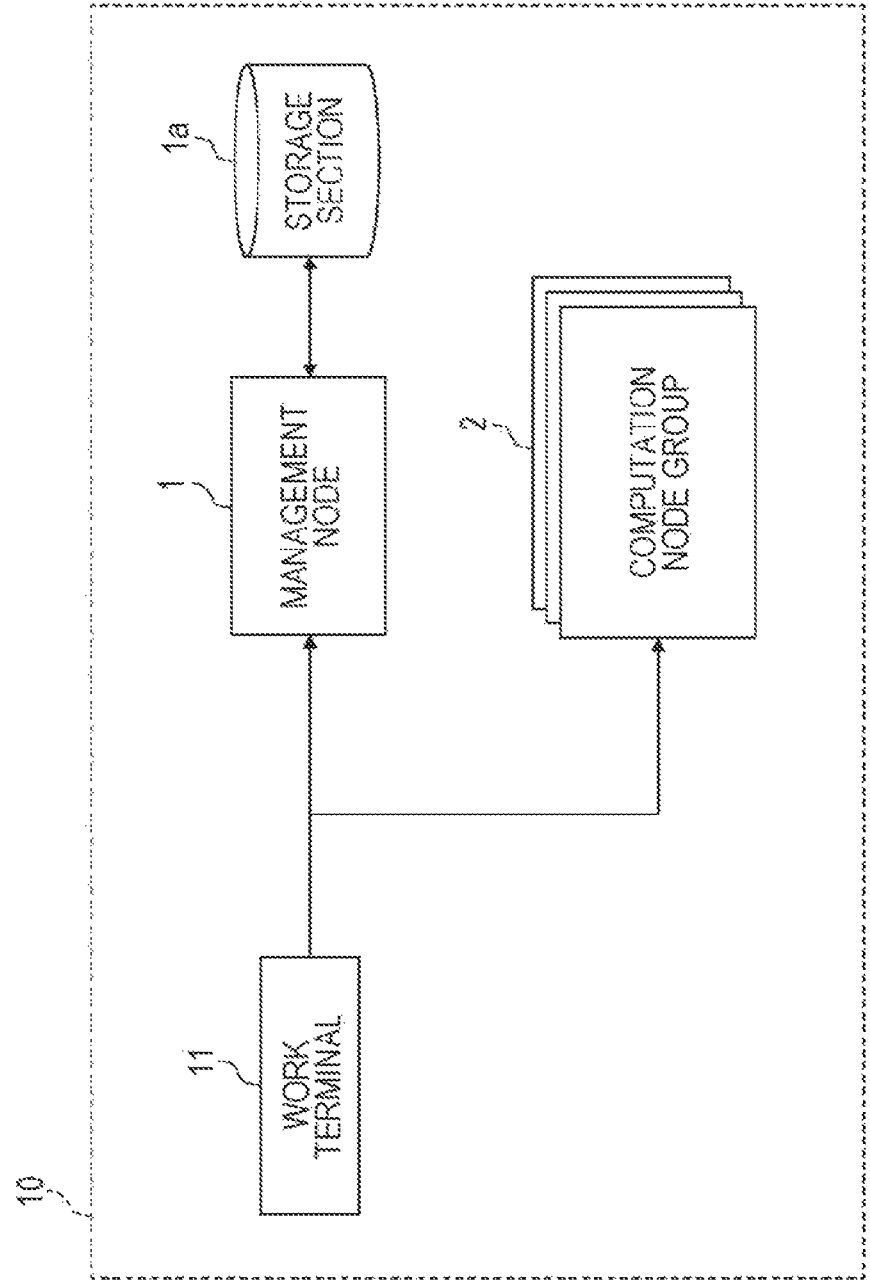
FIG. 12 is a diagram illustrating a summary of the operating frequency determination process in the first embodiment.

The management node 1 specifies the second program property information 141b, of the program property information 141 stored in the information storing region 130, that includes information most similar to the information included in the first program property information 141a obtained in S12 (S13). The management node 1, as illustrated in FIG. 12, estimates the first frequency information 133a to be the frequency information 133, of the frequency information 133 stored in the information storing region 130, that corresponds to the second program property information 141b specified in S13 (S14).

That is, the management node 1, upon creation of the first program, analyzes a description related to the instructions included in each loop in the first program and obtains the first program property information 141a which is the result of analysis. Then, the management node 1 specifies a test program, of the test programs, that correspond to the program property information 141 most similar to the content of the first program property information 141a. The management node 1 estimates the first frequency information 133a for the first program to be the frequency information 133 that corresponds to the specified test program. Accordingly, the management node 1 may estimate the first frequency information 133a for the first program without performing first-time execution of the first program in the computation node group 2.

As such, the management node 1 includes the property information management section 111 that stores in the information storing region 130 the program property information 141 (the innermost loop property information 131 and the other loops property information 132) in association with the frequency information 133 for each of the plurality of test programs. In addition, the management node 1 includes the information obtaining section 112 that obtains the first program property information 141a which is the program property information corresponding to the first program before execution of the first program. Furthermore, the management node 1 includes the operating frequency estimation section 113 that estimates the first frequency information 133a for the first program to be the frequency information 133 corresponding to the second program property information 141b, of the program property information 141, that includes information most similar to the information included in the first program property information 141a.

Accordingly, the developer may determine the minimum energy consumption frequency for the first program (first frequency information 133a) without performing first-time execution of the first program.

Influence of Conditions upon Execution of Program on Result of Estimation of First Frequency Information Influence of conditions upon execution of each program on the result of estimation of the first frequency information 133a will be described.

As described above, in a case of estimating the first frequency information 133a without performing first-time execution of the first program (in a case of performing static analysis of the first program), the result of estimation of the estimated first frequency information 133a may have to be unchanged according to the conditions and the like upon execution of the first program. Specifically, the result of estimation of the first frequency information 133a may have to be the same independently of, for example, the size of arrays (hereinafter, simply referred to as an array size) used upon execution of the first program.

At this point, the result of estimation of the first frequency information 133a, that is, the minimum energy consumption frequency does not change according to the array size in a case where the array size of the first program is greater than the cache size of the CPU executing a program and less than the paging size in which paging occurs upon execution of a program.

That is, in a case where the array size of the first program is greater than the paging size, the energy consumption accompanied by execution of the first program changes according to the frequency of occurrence of paging upon execution of the first program. The reason is that processing time changes according to timings such as rotational latencies, seek operation latencies, and the like of a disk for paging. In a case where the array size of the first program is less than the cache size of the CPU, the frequency of occurrence of misses in a cache memory of the CPU is such that misses, though misses basically do not occur in calculations of array data, occur due to influence of operation of programs, such as an OS, other than the first program (hereinafter, referred to as other programs). Misses due to the other programs occur at a low frequency as compared with the cycle of calculation loops and thus exert influence such that the energy consumption changes at each time of measurement. Therefore, the result of estimation of the first frequency information 133a, that is, the minimum energy consumption frequency may change according to the timing of measurement in a case where the array size is greater than the paging size or in a case where the array size is less than the cache size of the CPU.

Meanwhile, in a case where the array size of the first program is greater than the cache size of the CPU and less than the paging size, the frequency of occurrence of misses per unit time in the cache memory is high, and the number of occurrences of misses per unit time is almost unchanged in calculations of array data of the innermost loop. Although misses occur due to influence of other processes such as the OS, the frequency of misses is lower than that of misses in a calculation loop for array data. Thus, in this case, the result of estimation of the first frequency information 133a, that is, the minimum energy consumption frequency is not affected by the array size of the first program. Hereinafter, a relationship between the operating frequency and the energy consumption upon execution of a program will be described in a case of changing the array size in the range of greater than the cache size of the CPU and less than the paging size.

In an HPC system of a distributed memory type, the size of array data to be calculated is generally greater than that of the cache. In addition, in an HPC system of a distributed memory type, the number of computation nodes to be distributed is generally determined in such a manner that paging does not occur in order to suppress performance degradation.

Figure 13:
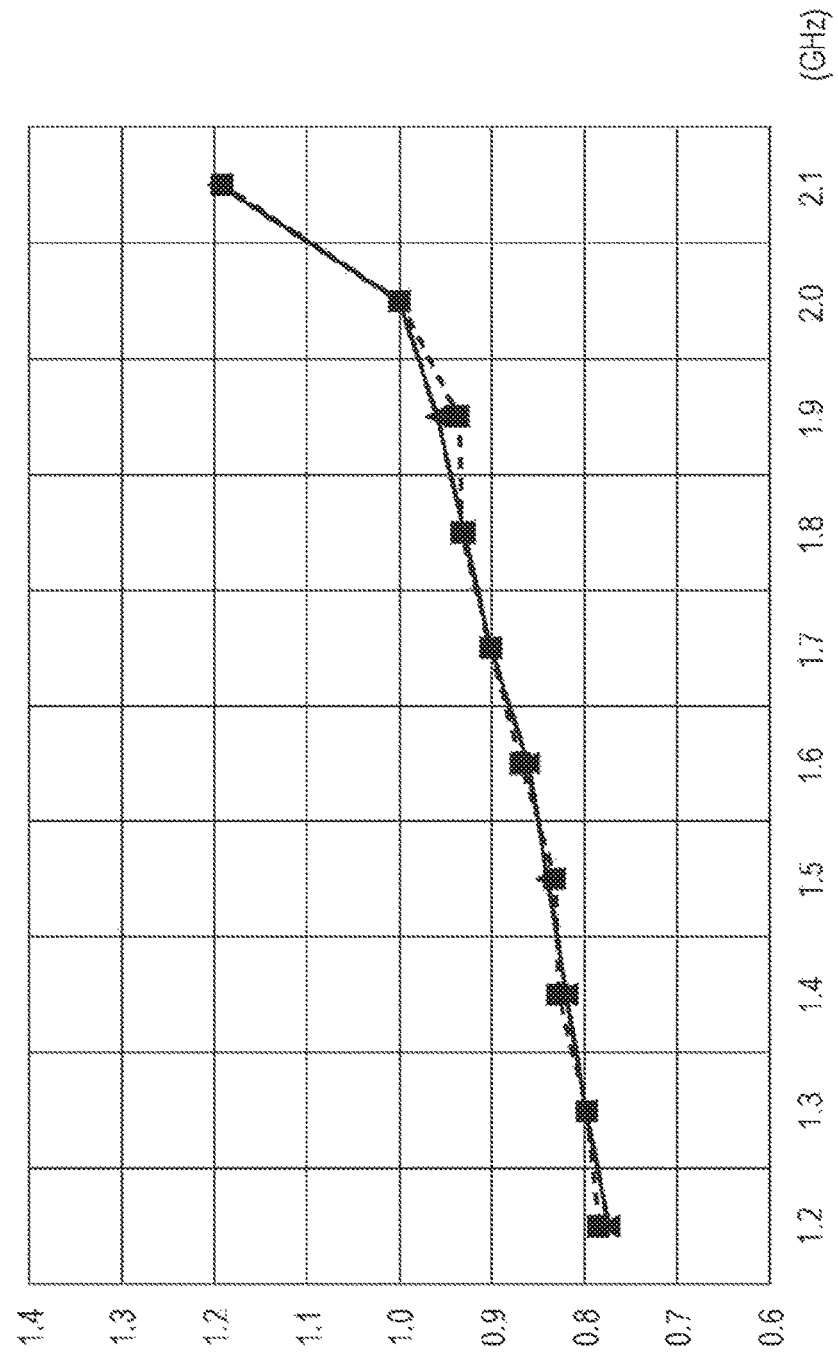
FIG. 13 is a diagram illustrating a summary of the operating frequency determination process in the first embodiment.
Figure 14:
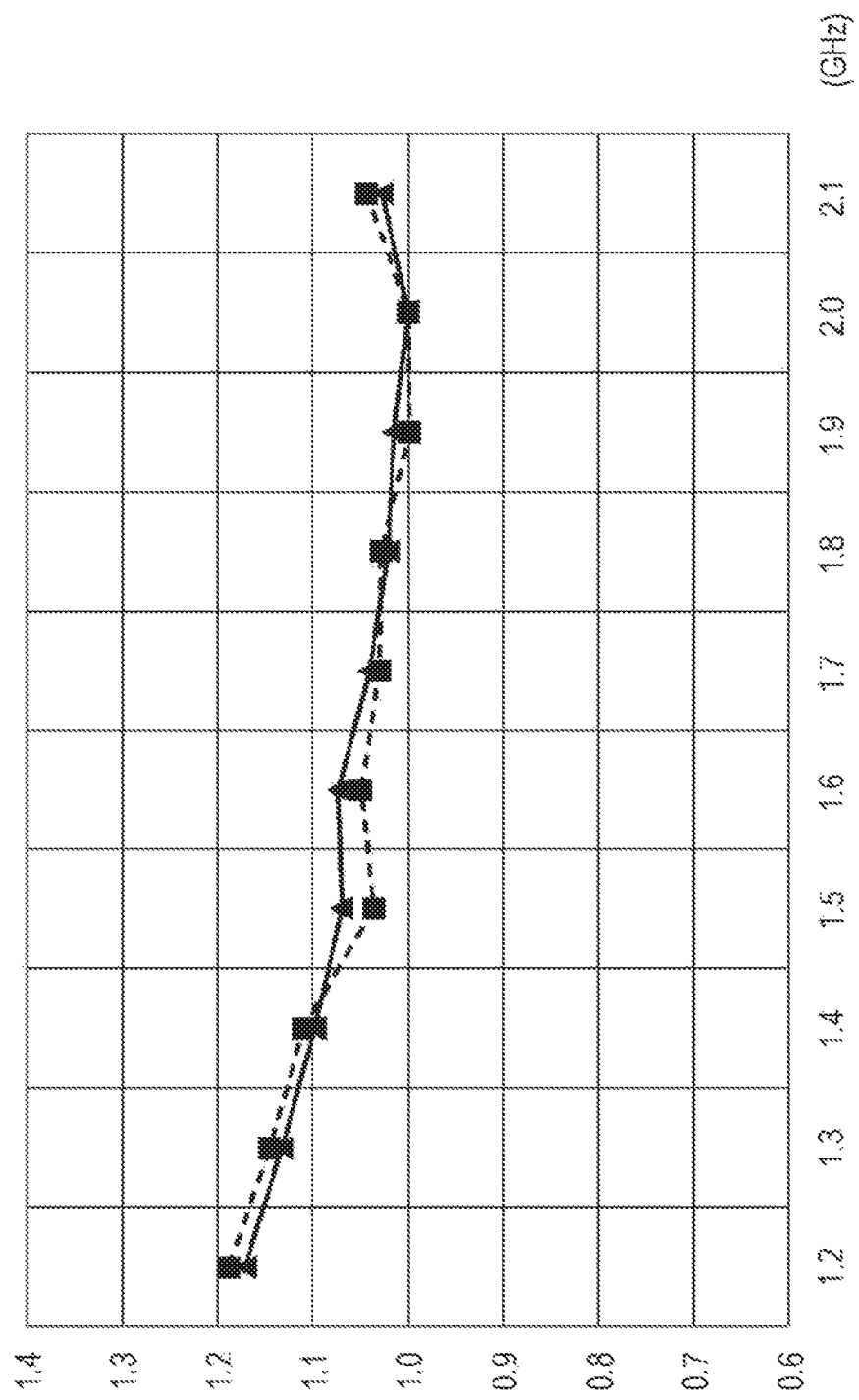
FIG. 14 is a diagram illustrating a summary of the operating frequency determination process in the first embodiment.

FIG. 13 and FIG. 14 are diagrams illustrating a relationship between the operating frequency and the energy consumption upon execution of a program in a case of changing the array size in the range of greater than the cache size of the CPU and less than the paging size. In the graphs illustrated in FIG. 13 and FIG. 14, the horizontal axis represents the operating frequency (GHz), and the vertical axis represents a relative energy consumption in a case where the energy consumption at an operating frequency of "2.0 (GHz)" is assumed to be "1.0". FIG. 13 is a diagram illustrating a relationship between the operating frequency and the relative energy consumption in a case of changing the array size of the test program A described with FIG. 2. FIG. 14 is a diagram illustrating a relationship between the operating frequency and the relative energy consumption in a case of changing the array size of the test program B described with FIG. 3.

As illustrated in FIG. 13 and FIG. 14, the relative energy consumption illustrated by two broken line graphs illustrated in each of FIG. 13 and FIG. 14 has approximately similar values independently of the value of the corresponding operating frequency. For example, in the example illustrated in FIG. 13, the minimum energy consumption frequency illustrated by the two broken line graphs illustrated in FIG. 13 is "1.2 (GHz)".

Therefore, the user of the first program may have to adjust the number of nodes to be distributed in such a manner that the array size is greater than the cache size of the CPU executing a program and less than the paging size in which paging occurs upon execution of a program.

Details of First Embodiment

Next, details of the first embodiment will be described. FIG. 15 to FIG. 18 are flowcharts illustrating details of the operating frequency determination process in the first embodiment. FIG. 19 to FIG. 30 are diagrams illustrating details of the operating frequency determination process in the first embodiment. With reference to FIG. 19 to FIG. 30, the operating frequency determination process of FIG. 15 to FIG. 18 will be described.

Details of Information Storing Process

Figure 15:
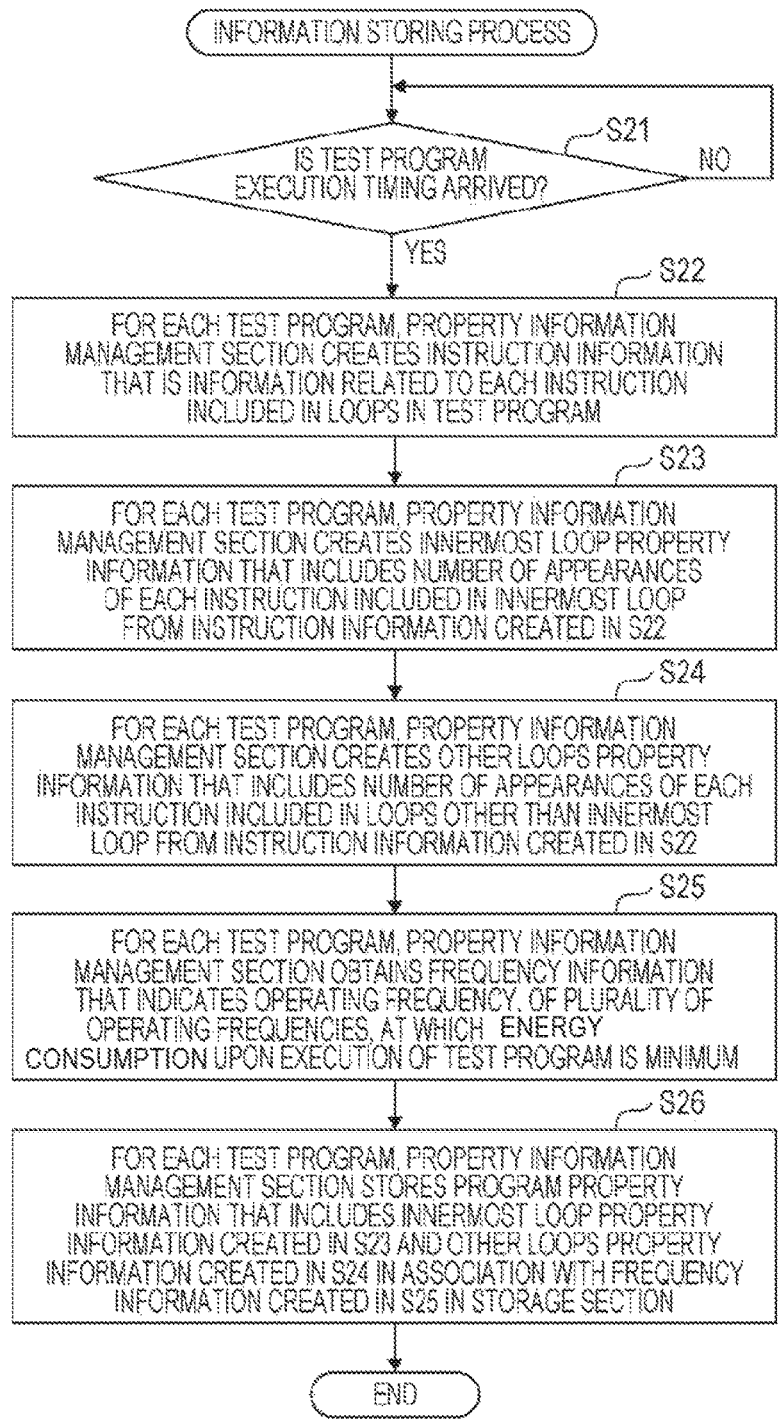
FIG. 15 is a flowchart illustrating details of the operating frequency determination process in the first embodiment.

First, details of the information storing process will be described. FIG. 15 is a flowchart illustrating details of the information storing process in the first embodiment.

The property information management section 111 waits until the test program execution timing as illustrated in FIG. 15 (NO in S21). In a case where the test program execution timing arrives (YES in S21), the management node 1 executes the test programs at the plurality of operating frequencies in the target system 10. For each test program, the property information management section 111 creates the instruction information 134 which is the information related to each instruction included in the loops in the test programs (S22). Hereinafter, details of the process of S22 will be described.

Details of Process of S22

Figure 17:
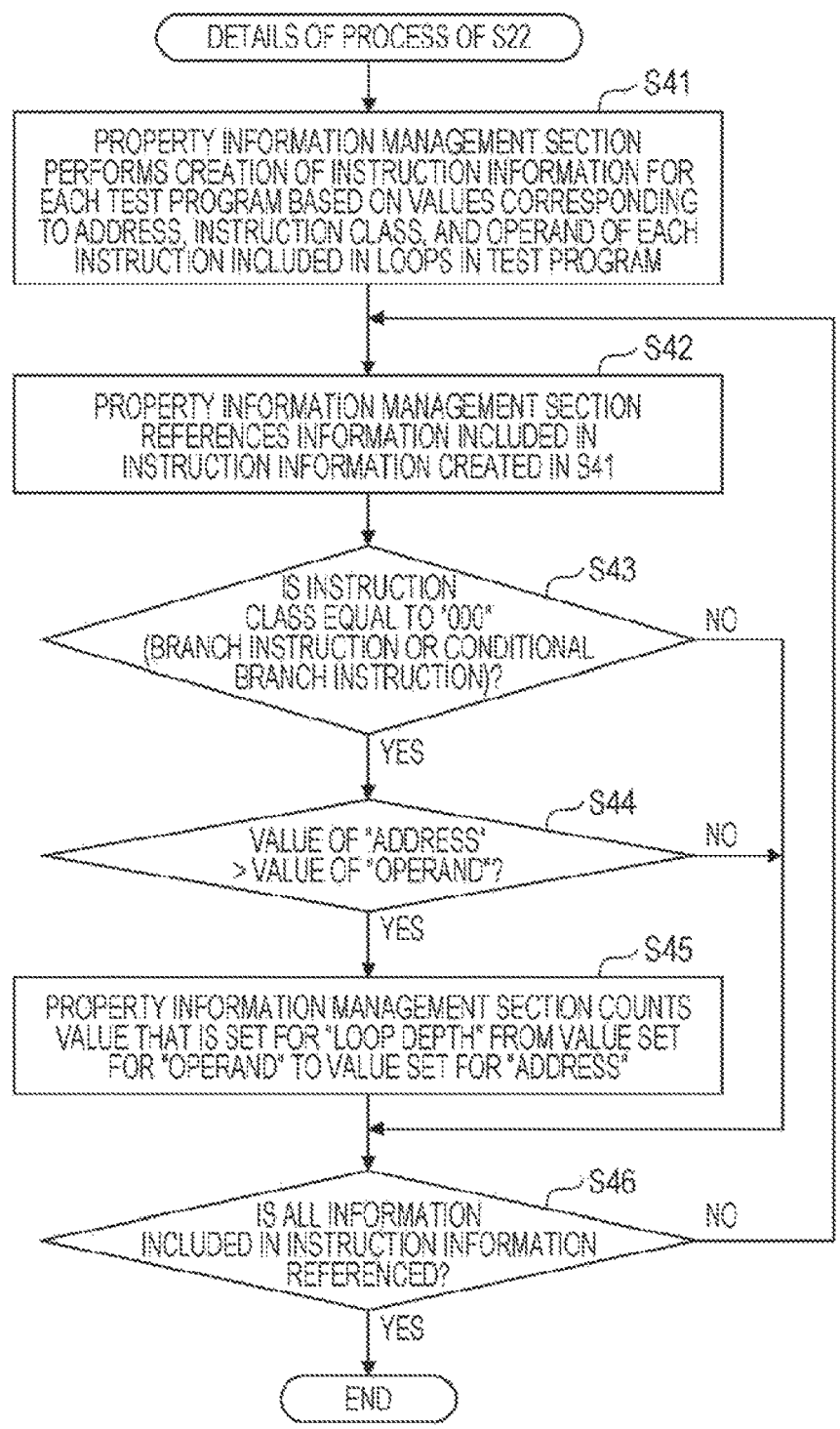
FIG. 17 is a flowchart illustrating details of the operating frequency determination process in the first embodiment.

FIG. 17 is a flowchart illustrating details of the process of S22. For each test program, the property information management section 111 performs creation of the instruction information 134 based on the values corresponding to the address, the instruction class, and the operand of each instruction included in the loops in the test program (S41). That is, the property information management section 111, before creation of the innermost loop property information 131 and the other loops property information 132, creates the instruction information 134 that includes information which may have to be referenced upon creation of the innermost loop property information 131 and the other loops property information 132. The property information management section 111, for example, disassembles the object program of the test program to obtain information (information corresponding to the address, the instruction class, and the operand of each instruction included in the test program) that may have to be used for creating the instruction information 134. Hereinafter, a specific example of the instruction information 134 created in the process of S41 will be described.

Specific Example of Instruction Information

FIG. 19 to FIG. 22 are diagrams illustrating a specific example of the instruction information 134. FIG. 19 to FIG. 22 are diagrams illustrating the instruction information 134, of the instruction information 134 created for each test program in the process of S41, that is related to one test program.

The instruction information 134 illustrated in FIG. 19 includes, as fields thereof, "number" that is used to identify each information included in the instruction information 134, "address" that indicates the position where each instruction included in the test program is stored, and "instruction class" that indicates the type of each instruction. In addition, the instruction information 134 illustrated in FIG. 19 includes, as fields thereof, "operand" that stores information used upon execution of each instruction and "loop depth" that stores the depth of the loop in which each instruction in the test program is included. The "loop depth" in the instruction information 134 of FIG. 19 is set to the initial value "0".

The "instruction class" is set to, for example, "000" that corresponds to a branch instruction or a conditional branch instruction of the CPU and "010" that corresponds to a call instruction of the CPU. In addition, the "instruction class" is set to, for example, "020", "030", "040", "050", and "060" that respectively correspond to a copy instruction, a logical calculation instruction, an integer addition or subtraction instruction, an integer multiplication instruction, and an integer division instruction of the CPU which accompany register access. In addition, the "instruction class" is set to, for example, "021", "031", "041", "051", and "061" that respectively correspond to a copy instruction, a logical calculation instruction, an integer addition or subtraction instruction, an integer multiplication instruction, and an integer division instruction of the CPU which accompany memory access.

Similarly, the "instruction class" is set to, for example, "120", "130", "140", "150", and "160" that respectively correspond to a copy instruction, a logical calculation instruction, a floating-point addition or subtraction instruction, a floating-point multiplication instruction, and a floating-point division instruction of a floating-point unit (FPU) which accompany register access. In addition, the "instruction class" is set to, for example, "121", "131", "141", "151", and "161" that respectively correspond to a copy instruction, a logical calculation instruction, a floating-point addition or subtraction instruction, a floating-point multiplication instruction, and a floating-point division instruction of the FPU which accompany memory access.

Furthermore, the "instruction class" is set to, for example, "220", "230", "240", "250", "260", and "270" that respectively correspond to a copy instruction, a logical calculation instruction, an SIMD addition or subtraction instruction, an SIMD multiplication instruction, an SIMD division instruction, and an SIMD composite instruction of a single instruction multiple data (SIMD) mechanism which accompany register access. In addition, the "instruction class" is set to, for example, "221", "231", "241", "251", "261", and "271" that respectively correspond to a copy instruction, an SIMD logical calculation instruction, an SIMD addition or subtraction instruction, an SIMD multiplication instruction, an SIMD division instruction, and an SIMD composite instruction of the SIMD mechanism which accompany memory access.

That is, the energy consumption accompanied by execution of each instruction included in the test program is determined by differences between the sizes or the structures of parts that operate upon execution of each instruction, such as the CPU. Specifically, for example, in addition, subtraction, and multiplication, it is found that, from the size of an operating circuit (for example, the number of transistors), the energy consumption in a case of executing multiplication is greater than the energy consumption in a case of executing addition and subtraction. In addition, for example, in integer calculation and floating-point calculation, the energy consumption in a case of executing floating-point calculation is greater than the energy consumption in a case of executing integer calculation. Furthermore, for example, in a dynamic random access memory (DRAM) that is widely used for a main memory and in a static random access memory (SRAM) that is widely used for a register, capacitors of the DRAM may have to be refreshed, though the SRAM has a greater number of constituent components. Thus, the energy consumption in a case of executing an instruction accompanying access to the DRAM is greater than the energy consumption in a case of executing an instruction accompanying access to the SRAM.

Thus, the energy consumption accompanied by execution of each instruction may be classified for each type of instruction (for each instruction operated by the same part upon execution thereof). Meanwhile, from the viewpoint of processing load and the like, it is difficult to obtain the actual energy consumption accompanied by execution of all of the instructions by measurement and the like.

Therefore, the property information management section 111 classifies each instruction included in the test program for each type of instruction upon creation of the instruction information 134 to set, in the instruction information 134, information used for specifying the characteristics of the energy consumption upon execution of each test program. The operating frequency estimation section 113, as described later, references the innermost loop property information 131 and the other loops property information 132, the creation of which is based on the instruction information 134, upon creation and the like of the first program.

Accordingly, the operating frequency estimation section 113, as described later, may estimate the first frequency information 133a. In addition, the property information management section 111, for example, does not have to obtain the actual energy consumption accompanied by execution of each instruction included in the test program.

Specifically, in the instruction information 134 illustrated in FIG. 19, the "address" of the information of which the "number" is "1" is set to "4004e8", and the "instruction class" thereof is set to "021 (the copy instruction of the CPU accompanying memory access)". While memory addresses that are accessed as objects are specified in the object program, memory addresses do not have to be considered in the instruction information 134 and thus are not described therein.

In the instruction information 134 illustrated in FIG. 19, a register number or an immediate value is usually specified in the "operand" of the information of which the "number" is "1" but does not have to be considered in the instruction information 134 and thus is not described therein. The "loop depth" in the instruction information 134 illustrated in FIG. 19 is set to the initial value "0".

Hereinafter, description will be provided assuming that information that indicates the "address" of an instruction at the destination of a jump or a call is set in the "operand" only in a case where the "instruction class" is "000 (a branch instruction or a conditional branch instruction of the CPU)" or the "instruction class" is "010 (a subroutine call instruction of the CPU)". Therefore, in the instruction information 134 illustrated in FIG. 19, information is set in only the "operand" of the information of which the "number" is "11", "13", and "15". Other information included in FIG. 19 will not be described.

Classification of the "instruction class" is dependent on differences between CPU activities or differences in design in the same CPU activity and is not limited to the above classification because there may be cases where detailed classification may have to be performed, classification may be combined for simplification, and functional classification such as SIMD may have to be added or removed. Basically, the classes of similar amounts of energy consumption may be combined, and instructions having different amounts of energy consumption to a certain extent may have to be divided into different classes.

FIG. 17 is referred to again. The property information management section 111 references information included in the instruction information 134 created in S41 (S42). Specifically, the property information management section 111 references information included in the instruction information 134 one line at a time in order from the head of the information. The property information management section 111 determines whether or not the "instruction class" of the referenced information is "000 (a branch instruction or a conditional branch instruction of the CPU)" (S43).

As a result, in a case where the "instruction class" of the referenced information is "000" (YES in S43), the property information management section 111 determines whether or not the value set in the "address" of the referenced information is greater than the value set in the "operand" (S44). In a case where the value set in the "address" is greater than the value set in the "operand" (YES in S44), the property information management section 111 counts the value set in the "loop depth" of the information corresponding to the value set in the "address" from the value set in the "operand" (S45).

That is, in a case where the value set in the "address" is greater than the value set in the "operand" in a branch instruction or a conditional branch instruction of the CPU, the property information management section 111 determines that there exists a loop in which the value set in the "address" ranges to the value set in the "operand". Thus, in this case, the property information management section 111 adds "1" to the value set in the "loop depth" from the information of which the "address" is the value set in the "operand" of the currently referenced information to the currently referenced information (the information corresponding to a branch instruction or a conditional branch instruction of the CPU). Accordingly, the instruction information 134 may retain information related to the depth of the loop of each instruction included in the test program.

What is also considered is a case where the value set in the "address" is greater than the value set in the "operand" while, actually, branching is performed in the flow of a usual process and not in a loop. This case may be determined by analyzing the object program in detail. However, generally, branching is performed in the loop that is predominant in the energy consumption and is less performed in the flow of a usual process. Even in a case of performing branching in the flow of a usual process, the number of instructions included in the flow of the process is small in many cases. Thus, in the present embodiment, a loop is determined to exist in a case where the value set in the "address" is greater than the value set in the "operand".

Meanwhile, in a case where the "instruction class" of the referenced information is not "000" (NO in S43) or in a case where the value set in the "address" is not greater than the value set in the "operand" (NO in S44), the property information management section 111 does not perform the process of S45.

The property information management section 111 determines whether or not all of the information included in each of the instruction information 134 created in S41 is referenced in the process of S42 (S46). As a result, in a case where not all of the information included in the each of the instruction information 134 created in S41 is referenced (NO in S46), the property information management section 111 performs the process of S42 and the subsequent processes again. Meanwhile, in a case where all of the information included in each of the instruction information 134 created in S41 is referenced (YES in S46), the property information management section 111 ends the process of S22. Hereinafter, a specific example of the processes from S42 to S46 will be described.

Specific Example of Processes from S42 to S46

In the instruction information 134 illustrated in FIG. 19, the property information management section 111 references information in order from the information of which the "number" is "1" (S42 and NO in S46). Since the "instruction class" of the information of which the "number" is "1" to "10" is not "000" (NO in S43), the property information management section 111 does not perform the processes of S44 and S45.

Next, the property information management section 111 references the information of which the "number" is "11" (NO in S46 and S42). As a result, since the "instruction class" of the information of which the "number" is "11" is "000" (YES in S43), the property information management section 111 determines whether or not "400525" which is the value of the "address" is greater than "40050a" which is the value of the "operand" (S44). Since the value of the "address" is greater than the value of the "operand" (YES in S44), the property information management section 111 adds "1" to the value set in the "loop depth" from the information of which the "address" is "40050a" to the information of which the "address" is "400525" (S45). Therefore, the property information management section 111, as illustrated in the underlined parts of FIG. 20, adds "1" to the value set in the "loop depth" from the information of which the "number" is "7" to the information of which the "number" is "11".

Next, the property information management section 111 references the information of which the "number" is "12" (NO in S46 and S42). Since the "instruction class" of the information of which the "number" is "12" is not "000" (NO in S43), the property information management section 111 does not perform the processes of S44 and S45.

Then, the property information management section 111 references the information of which the "number" is "13" (NO in S46 and S42). As a result, since the "instruction class" of the information of which the "number" is "13" is "000" (YES in S43), the property information management section 111 determines whether or not "400540" which is the value of the "address" is greater than "4004fb" which is the value of the "operand" (S44). Since the value of the "address" is greater than the value of the "operand" (YES in S44), the property information management section 111 adds "1" to the value set in the "loop depth" from the information of which the "address" is "4004fb" to the information of which the "address" is "400540" (S45). Thus, the property information management section 111, as illustrated in the underlined parts of FIG. 21, adds "1" to the value set in the "loop depth" from the information of which the "number" is "5" to the information of which the "number" is "13".

Next, the property information management section 111 references the information of which the "number" is "14" (NO in S46 and S42). Since the "instruction class" of the information of which the "number" is "14" is not "000" (NO in S43), the property information management section 111 does not perform the processes of S44 and S45.

Then, the property information management section 111 references the information of which the "number" is "15" (NO in S46 and S42). As a result, since the "instruction class" of the information of which the "number" is "15" is "000" (YES in S43), the property information management section 111 determines whether or not "40054c" which is the value of the "address" is greater than "4004f6" which is the value of the "operand" (S44). Since the value of the "address" is greater than the value of the "operand" (YES in S44), the property information management section 111 adds "1" to the value set in the "loop depth" from the information of which the "address" is "4004f6" to the information of which the "address" is "40054c" (S45). Thus, the property information management section 111, as illustrated in the underlined parts of FIG. 22, adds "1" to the value set in the "loop depth" from the information of which the "number" is "4" to the information of which the "number" is "15".

Next, the property information management section 111 references the information of which the "number" is "16" (NO in S46 and S42). Since the "instruction class" of the information of which the "number" is "16" is not "000" (NO in S43), the property information management section 111 does not perform the processes of S44 and S45. Then, since all of the information included in the instruction information 134 is obtained, the property information management section 111 ends the process of S22 (YES in S46).

FIG. 15 is referred to again. For each test program, the property information management section 111 creates the innermost loop property information 131 that includes the number of appearances of each instruction included in the innermost loop from the instruction information 134 created in S22 (S23). Hereinafter, a specific example of the innermost loop property information 131 will be described.

Specific Example of Innermost Loop Property Information

FIG. 23 is a diagram illustrating a specific example of the innermost loop property information 131. The innermost loop property information 131 illustrated in FIG. 23 is information of which the creation is based on the instruction information 134 illustrated in FIG. 22. That is, the innermost loop property information 131 illustrated in FIG. 23 is information based on the information of which the "loop depth" is "3" (the information related to the innermost loop) of the information related to the instructions included in the loops of the instruction information 134 illustrated in FIG. 22 (the information of which the "loop depth" is "1" to "3").

The innermost loop property information 131 illustrated in FIG. 23 includes, as fields thereof, "number" that is used to identify information in the innermost loop property information 131, "instruction class" that indicates the type of each instruction, and "number of appearances" that indicates the number of appearances of each instruction for each type.

Specifically, the "instruction class" of the information of which the "loop depth" is "3" (the information of which the "number" is "7" to "11") of the information included in the instruction information 134 illustrated in FIG. 22 is respectively set to "020", "020", "030", "021", and "000". Thus, the property information management section 111, as illustrated in FIG. 23, sets the "number of appearances" of the information of which the "instruction class" is "000", "020", "021", and "030" respectively to "1", "2", "1", and "1".

FIG. 15 is referred to again. For each test program, the property information management section 111 creates the other loops property information 132 that includes the number of appearances of each instruction included in the loops other than the innermost loop from the instruction information 134 created in S22 (S24). Hereinafter, a specific example of the other loops property information 132 will be described.

Specific Example of Other Loops Property Information

FIG. 24 is a diagram illustrating a specific example of the other loops property information 132. The other loops property information 132 illustrated in FIG. 24 is information of which the creation is based on the instruction information 134 illustrated in FIG. 22. That is, the other loops property information 132 illustrated in FIG. 24 is information based on the information of which the "loop depth" is "1" and "2" of the information related to the instructions included in the loops of the instruction information 134 illustrated in FIG. 22 (the information of which the "loop depth" is "1" to "3").

The other loops property information 132 illustrated in FIG. 24 includes the same fields as the innermost loop property information 131 described with FIG. 23. Specifically, the "instruction class" of the information of which the "loop depth" is "1" (the information of which the "number" is "4", "14", and "15") of the information included in the instruction information 134 illustrated in FIG. 22 is respectively set to "020", "021", and "000". The "instruction class" of the information of which the "loop depth" is "2" (the information of which the "number" is "5", "6", "12", and "13") of the information included in the instruction information 134 illustrated in FIG. 22 is respectively set to "020", "020", "020", and "000". Thus, the property information management section 111, as illustrated in FIG. 24, sets the "number of appearances" of the information of which the "instruction class" is "000", "020", and "021" respectively to "2", "4", and "1.".

In a case where information that is related to a plurality of independent loops is included in the instruction information 134, the property information management section 111, for example, may regard the loop, of the innermost loops, in which the value set in the "loop depth" is the greatest (the deepest loop) as the innermost loop.

FIG. 15 is referred to again. For each test program, the property information management section 111 creates the frequency information 133 that indicates the operating frequency, of the plurality of operating frequencies at which each sample program is operated, at which the energy consumption upon execution of the test program is the minimum (S25). Hereinafter, a specific example of the frequency information 133 will be described.

Specific Example of Frequency Information

FIG. 25 is a diagram illustrating a specific example of the frequency information 133. The frequency information 133 illustrated in FIG. 25 includes, as fields thereof, "number" that is used to identify each information included in the frequency information 133 and "operating frequency" that stores the operating frequency at which the energy consumption upon execution of the test program is the minimum. Specifically, in the frequency information 133 illustrated in FIG. 25, the "operating frequency information" of the information of which the "number" is "1" is set to "1.4 (GHz)".

FIG. 15 is referred to again. The property information management section 111 creates the correspondence information 142 in which the program property information 141 which includes the innermost loop property information 131 and the other loops property information 132 created in S23 and the like is associated with the frequency information 133 created in S25 for each test program (S26). The property information management section 111 stores the created correspondence information 142 in the information storing region 130 (S26). Hereinafter, a specific example of the correspondence information 142 will be described.

Specific Example of Correspondence Information

FIG. 26 is a diagram illustrating a specific example of the correspondence information 142. The correspondence information 142 illustrated in FIG. 26 includes, as fields thereof, "number" that is used to identify each information included in the correspondence information 142, "instruction class" that indicates the type of each instruction", and "innermost loop property information" in which the value set in the "number of appearances" of the innermost loop property information 131 is set. In addition, the correspondence information 142 illustrated in FIG. 26 includes, as fields thereof, "other loops property information" in which the value set in the "number of appearances" of the other loops property information 132 is set and "operating frequency" in which the value set in the frequency information 133 is set. In the correspondence information 142 illustrated in FIG. 26, the information of which the "number" is "1" is information that corresponds to the innermost loop property information 131 described with FIG. 23, the other loops property information 132 described with FIG. 24, and the frequency information 133 described with FIG. 25.

Specifically, in the innermost loop property information 131 illustrated in FIG. 23, the "number of appearances" of the information of which the "instruction class" is "000", "020", "021", and "030" is respectively set to "1.", "2", "1", and "1". Thus, the property information management section 111, as illustrated in the correspondence information 142 of FIG. 26, sets the "innermost loop property information" of the information of which the "number" is "1" and of which the "instruction class" is "000", "020", "021", "030", and "031" respectively to "1", "2", "1", "1", and "0".

Similarly, in the other loops property information 132 illustrated in FIG. 24, the "number of appearances" of the information of which the "instruction class" is "000", "020", and "021" is respectively set to "2", "4", and "1". Thus, the property information management section 111, as illustrated in the correspondence information 142 of FIG. 26, sets the "innermost loop property information" of the information of which the "number" is "1" and of which the "instruction class" is "000", "020", "021", "030", and "031" respectively to "2", "4", "1", "0", and "0".

Furthermore, the "operating frequency" of the frequency information 133 illustrated in FIG. 25 is set to "1.4 (GHz)".

Thus, the property information management section 111, as illustrated in the correspondence information 142 of FIG. 26, sets the "operating frequency" of the information of which the "number" is "1" to "1.4 (GHz)".

That is, the property information management section 111 may manage the innermost loop property information 131, the other loops property information 132, and the frequency information 133 in association with each other for each test program by creating the correspondence information 142 illustrated in FIG. 26. Thus, the operating frequency estimation section 113, as described later, may perform estimation of the first frequency information 133a for the first program based on the first innermost loop property information 131a and the first other loops property information 132a of the first program.

Details of Operating Frequency Estimation Process

Figure 16:
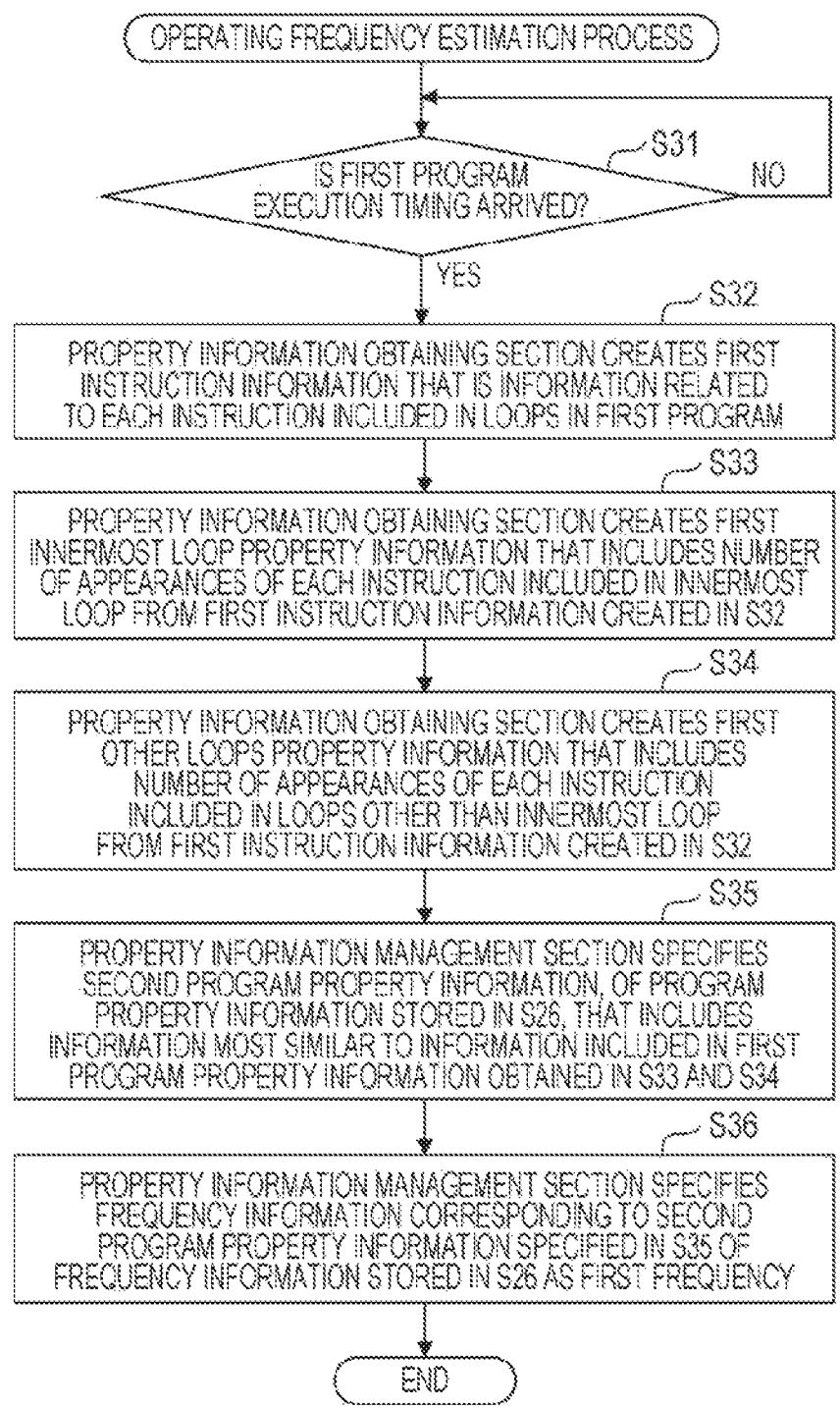
FIG. 16 is a flowchart illustrating details of the operating frequency determination process in the first embodiment.

Next, details of the operating frequency estimation process will be described. FIG. 16 is a flowchart illustrating details of the operating frequency estimation process in the first embodiment.

The property information obtaining section 112 waits until the first program execution timing as illustrated in FIG. 16 (NO in S31). Then, in a case where the first program execution timing arrives (YES in S31), the property information obtaining section 112 creates first instruction information 134a that is information related to each instruction included in the loops in the first program (S32). Details of the process of S32 have the same contents as the details of the process of S22 described with FIG. 17 and thus will not be described. Hereinafter, a specific example of the first instruction information 134a will be described.

Specific Example of First Instruction Information

FIG. 27 is a diagram illustrating a specific example of the first instruction information 134a. The first instruction information 134a illustrated in FIG. 27 includes the same fields as the instruction information 134 described with FIG. 19. Specifically, in the first instruction information 134a illustrated in FIG. 27, the "address" of the information of which the "number" is "1" is set to "4006d2", and the "instruction class" thereof is set to "021 (the copy instruction of the CPU accompanying memory access)". In the first instruction information 134a illustrated in FIG. 27, no information is set in the "operand" of the information of which the "number" is "1", and the "loop depth" thereof is set to the initial value "0". Other information included in FIG. 27 will not be described.

FIG. 16 is referred to again. The property information obtaining section 112 creates the first innermost loop property information 131a that includes the number of appearances of each instruction included in the innermost loop from the first instruction information 134a created in S32 (S33). Hereinafter, a specific example of the first innermost loop property information 131a will be described.

Specific Example of First Innermost Loop Property Information

FIG. 28 is a diagram illustrating a specific example of the first innermost loop property information 131a. The first innermost loop property information 131a illustrated in FIG. 28 is information of which the creation is based on the first instruction information 134a illustrated in FIG. 27. That is, the first innermost loop property information 131a illustrated in FIG. 28 is information of which the creation is based on the information of which the "loop depth" is "2" (the information related to the innermost loop) of the information included in the first instruction information 134a illustrated in FIG. 27.

The first innermost loop property information 131a illustrated in FIG. 28 includes the same fields as the innermost loop property information 131 described with FIG. 23. Specifically, the "instruction class" of the information of which the "loop depth" is "2" (the information of which the "number" is "4" to "6") of the information included in the first instruction information 134a illustrated in FIG. 27 is respectively set to "020", "020", and "000". Thus, the property information obtaining section 112, as illustrated in FIG. 28, sets the "number of appearances" of the information of which the "instruction class" is "000" and "020" respectively to "1" and "2".

FIG. 16 is referred to again. The property information obtaining section 112 creates the first other loops property information 132a that includes the number of appearances of each instruction included in the loops other than the innermost loop from the first instruction information 134a created in S32 (S34). Hereinafter, a specific example of the first other loops property information 132a will be described.

Specific Example of First Other Loops Property Information

FIG. 29 is a diagram illustrating a specific example of the first other loops property information 132a. The first other loops property information 132a illustrated in FIG. 29 is information of which the creation is based on the first instruction information 134a illustrated in FIG. 27. That is, the first other loops property information 132a illustrated in FIG. 29 is information of which the creation is based on the information of which the "loop depth" is "1" of the information included in the first instruction information 134a illustrated in FIG. 27.

The first other loops property information 132a illustrated in FIG. 29 includes the same fields as the innermost loop property information 131 described with FIG. 23. Specifically, the "instruction class" of the information of which the "loop depth" is "1" (the information of which the "number" is "2", "3", and "7" to "9") of the information included in the first instruction information 134a illustrated in FIG. 27 is respectively set to "020", "031", "021", "020", and "000". Thus, the property information obtaining section 112, as illustrated in FIG. 29, sets the "number of appearances" of the information of which the "instruction class" is "000", "020", "021", and "031" respectively to "1", "2", "1", and "1".

FIG. 16 is referred to again. The property information obtaining section 112 specifies the second program property information 141b, of the program property information 141 stored in S26, that includes information most similar to the information included in the first program property information 141a obtained in S33 and S34 (S25). Accordingly, the property information obtaining section 112, as described later, may estimate the first frequency information 133a at which the energy consumption accompanied by execution of the first program is the minimum to be the frequency information 133 that is stored in association with the second program property information 141b.

Specifically, the property information obtaining section 112, for example, creates first correspondence information 142a that includes the first innermost loop property information 131a and the first other loops property information 132a as illustrated in FIG. 30. Hereinafter, a specific example of the first correspondence information 142a will be described.

Specific Example of First Correspondence Information

FIG. 30 is a diagram illustrating a specific example of the first correspondence information 142a. The first correspondence information 142a illustrated in FIG. 30 includes, as fields thereof, "number" that is used to identify each information included in the first correspondence information 142a, "instruction class" that indicates the type of each instruction, and "innermost loop property information" in which the value set in the "number of appearances" of the innermost loop property information 131 is set. In addition, the first correspondence information 142a illustrated in FIG. 30 includes, as fields thereof, "other loops property information" in which the value set in the "number of appearances" of the other loops property information 132 is set. In the first correspondence information 142a illustrated in FIG. 30, the information of which the "number" is "1" is information that corresponds to the first innermost loop property information 131a described with FIG. 28 and the first other loops property information 132a described with FIG. 29.

The property information obtaining section 112 obtains information in which the information set in the "innermost loop property information" and in the "other loops property information" in the correspondence information 142 described with FIG. 26 is most similar to the information set in the "innermost loop property information" and in the "other loops property information" of the first correspondence information 142.

Specifically, the information, of the information included in the correspondence information 142 illustrated in FIG. 26, in which the matching ratio of the information set in the "innermost loop property information" and in the "other loops property information" to the first correspondence information 142a is the greatest is the information of which the "number" is "3". Thus, the property information obtaining section 112, for example, specifies the information of which the "number" is "3" in the correspondence information 142 illustrated in FIG. 26 as the second program property information 141b.

FIG. 16 is referred to again. The property information obtaining section 112 estimates the first frequency information 133a at which the energy consumption accompanied by execution of the first program is the minimum to be the frequency information 133, of the frequency information 133 stored in S26, that corresponds to the second program property information 141b specified in S35 (S36).

Specifically, in the example illustrated in FIG. 26, the property information obtaining section 112 specifies "1.6 (GHz)" which is the "operating frequency" of the information of which the "number" is "3" (the information specified in the process of S35). Accordingly, the property information obtaining section 112 may estimate the first frequency information 133a for the first program.

In the process of S35, in a case where it is determined that the second program property information 141b does not exist in the information included in the correspondence information 142, the developer notification section 115 may stop the operating frequency estimation process and notify the non-existence to the developer.

Second Embodiment

Next, an information storing process in a second embodiment will be described. FIG. 31 is a diagram illustrating a specific example of the other loops property information 132 in the second embodiment.

In the information storing process in the second embodiment, information that is set in the "loop depth" included in the instruction information 134 is considered upon creation of the other loops property information 132. Specifically, the property information management section 111 attaches weight that is defined for each information set in the "loop depth" to each information set in the "loop depth" and determines the information to be set in the "number of appearances". Accordingly, the property information management section 111, for example, may set a larger value for the information in the "number of appearances" as the value set in the "loop depth" of the instruction is larger.

For example, in a case where the same number of calculation instructions is detected by static analysis of the loop of which the "loop depth" is "2" and the loop of which the "loop depth" is "3", the loop of which the "loop depth" is "3", upon execution, executes the number of instructions multiplied by the number of executions of the loop without executing the same number of instructions. That is, rendering the number of appearances of instructions of the loop of which the "loop depth" is "2" equal to the number of appearances of instructions of the loop of which the "loop depth" is "3" is not appropriate in a real-world circumstance. Thus, in a case where the loop depth is different, the number of instructions obtained by the static analysis may have to be multiplied by a coefficient that corresponds to the number of executions of the loop. However, the number of executions of the loop may be determined by executing the program. Thus, the number of executions of the loop may not be determined in the static analysis.

Therefore, weighting corresponding to the loop depth is performed in the static analysis in the present embodiment. Accordingly, the number of appearances of calculations is increased as the loop depth is larger, and the property information management section 111 may increase the value of the information set in the "number of appearances".

The information storing process in the second embodiment is only different in the process of S24 from the information storing process in the first embodiment. Thus, hereinafter, the process of S24 in the second embodiment will be described.

Process of S24 in Second Embodiment

Figure 18:
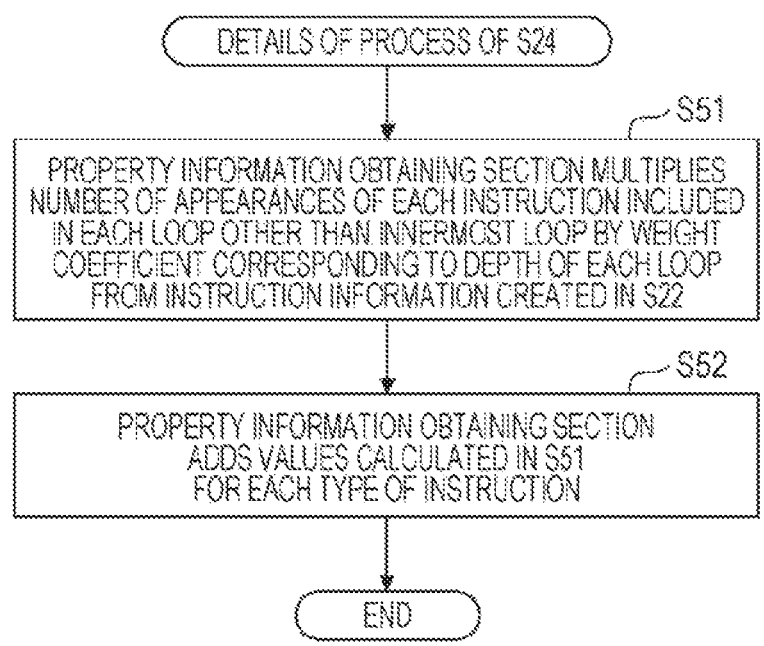
FIG. 18 is a flowchart illustrating details of the operating frequency determination process in the first embodiment.

FIG. 18 is a flowchart illustrating the process of S24 in the second embodiment. The property information management section 111 performs multiplication of the number of appearances of each instruction included in each loop other than the innermost loop and the weight coefficient corresponding to the depth of each loop based on the instruction information 134 created in S22 (S51). The property information management section 111 adds the values calculated in S51 for each type of instruction (S52).

In this case, the property information management section 111 may use, for example, the value of which the base is "2" and of which the exponent is "the information set in the "loop depth"" as the weight coefficient. That is, in this case, the weight coefficient for the information of which the "loop depth" is "0" is "$2^0$", the weight coefficient for the information of which the "loop depth" is "1" is "$2^1$", and the weight coefficient for the information of which the "loop depth" is "2" is "$2^2$".

Specifically, in the instruction information 134 illustrated in FIG. 22, for example, of the information of which the "instruction class" is "020", the number of pieces of information of which the "loop depth" is "1" is "1", and the number of pieces of information of which the "loop depth" is "2" is "3". Thus, in this case, the property information management section 111 adds the value obtained by multiplication of "1", which is the number of pieces of information of which the "loop depth" is "1", and "$2^1$", which is the weight coefficient, to the value obtained by multiplication of "3", which is the number of pieces of information of which the "loop depth" is "2", and "$2^2$", which is the weight coefficient, to calculate the value "14".

The property information management section 111, as illustrated in FIG. 31, sets the "number of appearances" corresponding to the information of which the "instruction class" is "020" (the information of which the "number" is "2") to "14". Other information of FIG. 31 will not be described. Accordingly, the property information management section 111 may reflect the information set in the "loop depth" included in the instruction information 134 upon creation of the other loops property information 132.

The property information management section 111 may use the value indicated by the weight information 135 stored in the information storing region 130 (information set in advance by the developer and the like in the management node 1) as the weight coefficient.

Third Embodiment

Next, an information storing process and an operating frequency estimation process in a third embodiment will be described. FIG. 32 is a diagram illustrating a specific example of a neural network in the third embodiment.

The information storing process and the operating frequency estimation process in the third embodiment store the innermost loop property information 131, the other loops property information 132, and the frequency information 133 using a neural network.

A neural network is a computation technique that simulates information processing of a neural circuit in a human brain. The neural network learns a relationship between known input information and output information and is used to estimate output information from input information that is not learned. The third embodiment employs, for example, a hierarchical neural network as a neural network model and backpropagation that is a supervised learning method as a learning method.

Specifically, the property information management section 111 (the property information management section 111 configured of the neural network) in the third embodiment includes input units (white circles marked with "000 (innermost)" to "031 (innermost)" in FIG. 32) that respectively correspond to the types of instructions included in the innermost loop property information 131. In addition, the property information management section 111 in the third embodiment includes input units (white circles marked with "000 (other)" to "031 (other)" in FIG. 32) that respectively correspond to the types of instructions included in the other loops property information 132. Furthermore, the property information management section 111 in the third embodiment includes output units (white circles marked with "1.2 (GHz)" to "2.0 (GHz)" in FIG. 32) that respectively correspond to the plurality of operating frequencies upon execution of the test programs.

Specifically, the property information management section 111, for example, learns the value set in the "number of appearances" in the innermost loop property information 131 described with FIG. 23 and the value set in the "number of appearances" in the other loops property information 132 described with FIG. 24 as input-side teacher data of the neural network. In addition, the property information management section 111 learns "1" (hereinafter, referred to as first information) as output-side teacher data in the output unit corresponding to the value set in the "operating frequency" in the frequency information 133 described with FIG. 25 and learns "0" (hereinafter, referred to as second information) as output-side teacher data in the output unit corresponding to a value other than the value set in the "operating frequency" in the frequency information 133 described with FIG. 25.

The property information obtaining section 112 in the third embodiment inputs each of the values set in the "number of appearances" in the first innermost loop property information 131a and in the first other loops property information 132a into the corresponding property information management section 111. The property information management section 111 in the third embodiment estimates the first frequency information 133a for the first program to be the information output from the output units.

That is, information that has the same content as the first program property information 141a may not exist in the program property information 141. In this case, the property information obtaining section 112 may not estimate the first frequency information 133a by simple comparison.

Therefore, the property information management section 111 in the third embodiment stores the innermost loop property information 131, the other loops property information 132, and the frequency information 133 by learning in the neural network. Accordingly, the property information obtaining section 112 in the third embodiment, even in a case where information having the same content as the first program property information 141a does not exist, may obtain frequency information, of the frequency information 133 learned, that is most appropriate as the first frequency information 133a by using a generalization function of the neural network. Therefore, the property information obtaining section 112 may estimate the first frequency information 133a even in a case where information having the same content as the first program property information 141a does not exist in the program property information 141.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computation apparatus, comprising:
a memory; and
one or more processors coupled to the memory and configured to:
store, based on a result of executing each of sample programs at a plurality of operating frequencies, program property information that includes innermost loop property information and other loops property information in association with a minimum operating frequency for each of the sample programs, the innermost loop property information including a number of instructions for each type included in an innermost loop of instructions included in loops in the sample program, the other loops property information including a number of instructions for each type included in the loops other than the innermost loop of the instructions included in the loops in the sample program, and the minimum operating frequency indicating an operating frequency, of the plurality of operating frequencies, at which energy consumption upon execution of each of the sample programs is the minimum;
obtain first program property information that is the program property information corresponding to a first program before execution of the first program that is a program other than each of the sample programs; and
specify second program property information, of the program property information stored in the memory, that includes information most similar to information included in the first program property information obtained and estimating a first operating frequency at which the energy consumption upon execution of the first program is the minimum to be an operating frequency, of the minimum operating frequencies stored in the memory, that corresponds to the second program property information specified, the first operating frequency being set to central processing units of a target system.

2. The computation apparatus according to claim 1, wherein the computation apparatus specifies program property information, of the program property information stored, in which the matching ratio of information included in each program property information to the information included in the first program property information is the greatest as the second program property information.

3. The computation apparatus according to claim 1, wherein the computation apparatus stops estimating the operating frequency corresponding to the second program property information in a case where information in which the matching ratio of the information included in each program property information to the information included in the first program property information is less than or equal to a predetermined threshold in the program property information stored.

4. The computation apparatus according to claim 1, wherein the computation apparatus performs storing information by learning the program property information as input-side teacher data and the minimum frequency as output-side teacher data in a neural network.

5. The computation apparatus according to claim 4, wherein the neural network includes a plurality of input units that respectively correspond to types of instructions included in the innermost loop property information and types of instructions included in the other loops property information and a plurality of output units that respectively correspond to the plurality of operating frequencies, and
the computation apparatus inputs the number of instructions for each type included in the innermost loop property information and the number of instructions for each type included in the other loops property information from the plurality of input units, inputs first information into an output unit of the plurality of output units that corresponds to the minimum operating frequency, and inputs second information into an output unit of the plurality of output units that corresponds to an operating frequency other than the minimum operating frequency.

6. The computation apparatus according to claim 1, further configured to perform
creating the other loops property information by multiplying the number of instructions for each type of instruction included in the loops other than the innermost loop of the loops in each of the sample programs by a weight coefficient corresponding to the depth of each loop and adding the multiplied value for each type of instruction.

7. The computation apparatus according to claim 1, wherein the types of instructions are classified by differences in the energy consumption in a case of executing the instructions.

8. The computation apparatus according to claim 7, wherein the energy consumption is determined by the structures and the sizes of parts that operate upon execution of each of the instructions in a processor.

9. The computation apparatus according to claim 7, wherein the types of instructions include the same instruction that is classified by instructions performing register access and instructions performing memory access.

10. An operating frequency determination method configured to use one or more processors included in a computation apparatus, the operating frequency determination method comprising:

storing, based on a result of executing each of sample programs at a plurality of operating frequencies, program property information that includes innermost loop property information and other loops property information in association with a minimum operating frequency for each of the sample programs, the innermost loop property information including a number of instructions for each type included in an innermost loop of instructions included in loops in each of the sample programs, the other loops property information including a number of instructions for each type included in the loops other than the innermost loop of the instructions included in the loops in each of the sample programs, and the minimum operating frequency indicating an operating frequency, of the plurality of operating frequencies, at which energy consumption upon execution of each of the sample programs is the minimum;

obtaining first program property information that is the program property information corresponding to a first program before execution of the first program that is a program other than each of the sample programs;

specifying second program property information, of the program property information stored in a memory, that includes information most similar to information included in the first program property information obtained and estimating a first operating frequency at which the energy consumption upon execution of the first program is the minimum to be an operating frequency, of the minimum operating frequencies stored in the memory, that corresponds to the second program property information specified, and setting the first operating frequency to central processing units of a target system.

11. A non-transitory, computer-readable recording medium having stored therein a program for causing a computer to execute a process, the process comprising:

storing, based on a result of executing each of sample programs at a plurality of operating frequencies, program property information that includes innermost loop property information and other loops property information in association with a minimum operating frequency for each of the sample programs, the innermost loop property information including a number of instructions for each type included in an innermost loop of instructions included in loops in each of the sample programs, the other loops property information including a number of instructions for each type included in the loops other than the innermost loop of the instructions included in the loops in each of the sample programs, and the minimum operating frequency indicating an operating frequency, of the plurality of operating frequencies, at which energy consumption upon execution of each of the sample programs is the minimum;

obtaining first program property information that is the program property information corresponding to a first program before execution of the first program that is a program other than each of the sample programs;

specifying second program property information, of the program property information stored in a memory, that includes information most similar to information included in the first program property information obtained and estimating a first operating frequency at which the energy consumption upon execution of the first program is the minimum to be an operating frequency, of the minimum operating frequencies stored in the memory, that corresponds to the second program property information specified, and setting the first operating frequency to central processing units of a target system.

* * * * *